(12) United States Patent
Marmo

(10) Patent No.: US 12,298,561 B2
(45) Date of Patent: May 13, 2025

(54) RE-SPLICEABLE SPLICE-ON CONNECTOR AND METHOD OF MAKING SAME

(71) Applicant: John Marmo, West Islip, NY (US)

(72) Inventor: John Marmo, West Islip, NY (US)

( * ) Notice: Subject to any disclaimer, the term of this patent is extended or adjusted under 35 U.S.C. 154(b) by 195 days.

(21) Appl. No.: 18/197,967

(22) Filed: May 16, 2023

(65) Prior Publication Data
US 2023/0280533 A1    Sep. 7, 2023

Related U.S. Application Data

(63) Continuation-in-part of application No. 17/525,864, filed on Nov. 13, 2021, now abandoned.

(51) Int. Cl.
*G02B 6/245* (2006.01)
*G02B 6/255* (2006.01)
*G02B 6/38* (2006.01)

(52) U.S. Cl.
CPC .......... *G02B 6/2553* (2013.01); *G02B 6/245* (2013.01); *G02B 6/2551* (2013.01); *G02B 6/2552* (2013.01); *G02B 6/2558* (2013.01); *G02B 6/3846* (2013.01)

(58) Field of Classification Search
CPC .... G02B 6/245; G02B 6/2551; G02B 6/2552; G02B 6/2553; G02B 6/2558; G02B 6/3846
See application file for complete search history.

(56) References Cited

U.S. PATENT DOCUMENTS

| | | | |
|---|---|---|---|
| 4,728,170 A | 3/1988 | Robertson | |
| 5,993,071 A | 11/1999 | Maria | |
| 6,805,491 B2 | 10/2004 | Durrant | |
| 6,955,478 B2 | 10/2005 | Durrant | |
| 7,178,990 B2 | 2/2007 | Caveney | |
| 7,186,035 B2 | 3/2007 | Dunn | |
| 7,261,473 B2 | 8/2007 | Owen | |
| 7,956,992 B2 | 6/2011 | Watte | |
| 8,043,013 B2 | 10/2011 | Lichoulas | |
| 8,047,726 B2 * | 11/2011 | Tamekuni | G02B 6/38875 385/98 |
| 8,408,811 B2 * | 4/2013 | de Jong | G02B 6/3846 385/69 |
| 8,556,521 B2 | 10/2013 | Everett | |

(Continued)

*Primary Examiner* — Ryan A Lepisto
(74) *Attorney, Agent, or Firm* — Edison Law Group; Jerome Drabiak

(57) ABSTRACT

A method of re-splicing a splice-on connector ("SOC") includes at least five steps: (1) stripping insulation from an end portion of a first optic fiber; (2) stripping insulation from an end portion of a second optic fiber having a connector body fixed to an opposite end portion thereof. One end portion of the connector body is sized and configured to be inserted into an end portion of an elongated hollow member. The method also includes: (3) splicing together the first and second fiber optic end portions to produce either an SOC or a re-spliced splice-on connector ("RSSOC"). The SOC has a predetermined length to enable cutting at three predetermined locations spaced from the connector body. The method further includes: (4) if an operational fault is caused in a system using the SOC or RSSOC, cutting the SOC or the RSSOC at one of the three predetermined regions; and (5) repeating step (3).

14 Claims, 19 Drawing Sheets

(56) References Cited

U.S. PATENT DOCUMENTS

| | | | |
|---|---|---|---|
| 9,557,492 B2 | 1/2017 | Park | |
| 9,897,770 B2 | 2/2018 | Park | |
| 9,989,711 B2 * | 6/2018 | Ott | G02B 6/3821 |
| 10,345,536 B2 | 7/2019 | Shao | |
| 10,473,859 B2 | 11/2019 | Chabot | |
| 10,761,277 B2 | 9/2020 | Durrant | |
| 10,770,831 B2 | 9/2020 | Kralik | |
| 11,906,782 B2 * | 2/2024 | Petersen | G02B 6/2558 |
| 11,947,165 B2 * | 4/2024 | Petersen | G02B 6/4471 |
| 2013/0004128 A1 | 1/2013 | Zhang | |
| 2017/0212313 A1 * | 7/2017 | Elenabaas | G02B 6/3821 |
| 2021/0103097 A1 | 4/2021 | Wang | |

\* cited by examiner

RE-SPLICEABLE SPLICE-ON CONNECTOR AND METHOD OF MAKING SAME

REFERENCE TO RELATED APPLICATION

This application is a continuation-in-part ("CIP") of U.S. patent application Ser. No. 17/525,864 filed Nov. 13, 2021, hereby incorporated by reference in its entirety for priority purposes pursuant to Title 35, United States Code, Section 120.

FIELD

The present subject matter, in general, is directed to an optic fiber stub portion and, more particularly, is directed to a re-spliceable splice-on connector.

An optic fiber is a flexible and transparent fiber manufactured by drawing glass or plastic to a diameter slightly more than the diameter of a strand of human hair. [See "Optical Fiber," The Fiber Optic Association.] Optic fibers, able to transmit light between end portions of optic fiber, are used in fiber-optic communications, as fibers permit data transmission over greater distances and at higher bandwidths ("higher data transfer rates") than electrical cables. ["Optical Fiber," cited above.]

Optic fibers are used instead of metal wires since signals travel along optic fibers with less flux intensity loss through them. [*Optical Fiber Communications: Principles and Practice*, by Senior, John M; and Jamro, M. Yousif (2009), Pearson education, pp. 7-9.] Also, optic fibers are immune to electromagnetic interference, a problem experienced when using metal wires. [*Optical Fiber Communications.*]

In addition, optic fibers have a core covered by a transparent cladding material which has a lower index of refraction. [*Optical Fiber Communications.*]Light is kept in the core by the phenomenon of total internal reflection, thus causing the fiber to function as a waveguide. [*Optical Fiber Communications*, pages 12-14.]

Joining optic fibers with low loss is important in optic fiber communication. [*Optical Fiber Communications*, page 218.] Joining optic fibers, more complex than joining electrical wires or cables, involves careful cleaving of the optic fibers, precise alignment of fiber cores, and the precise coupling of resulting-aligned cores. [*Optical Fiber Communications.*] For applications requiring permanent connections, a fusion splicer is typically used. Employing a fusion splicer technique, an electric arc is used to melt two optic fiber ends together. [*Optical Fiber Communications.*]

Certain terms which I shall use throughout this patent application shall now be noted and defined as follows. The term "connector" shall be understood to refer to an optic fiber connector having four basic components: a ferrule; a connector body; a cable; and a coupling device. The term "fiber stub" shall be understood to refer to a length or piece of optic fiber, ordinarily very short in length, that extends from the back of a connector. The term "fiber stub length" shall be understood to refer to length, which will vary and can be about 125 mm, a preferred length for the present subject matter, for optic fiber extending from the back of a connector.

The term "fusion splicer" shall be understood to refer to a machine using an electric arc to melt two optic fibers together at cleaved end faces to form fused optic fiber. A resulting fusion splice permanently joins two optic fibers end-to-end, enabling light signals to pass from one end to the other with little loss. The splicer precisely adjusts, automatically in modern devices, light-guiding cores at the ends of the fibers to be spliced. The term "cable holder" refers to a device that positions or holds optic fiber cable in a splicer. Cable holders differ based on optic fiber diameter, with the most popular cable holders being designed for 250 µm, 900 µm, 2 mm, and 3 mm diameter cables, and 12-fiber "ribbon cable" consisting of twelve individual 250 µm diameter cables bonded together as a single cable. A "cable" consists of a core, cladding, buffer, and jacket. (See Wikipedia for such cable layers.)

The term "connector holder" shall be understood to refer to a device that holds and properly positions the connectors in a fusion splicer for splicing. The term "rubber boot" shall be understood to refer to an elongated (hollow) silicone rubber material, sized and shaped to cover and protect the splice area of the optic fiber. The rubber boot also connects to the connector, and thereby provides strain relief. The term "rubber boot length" shall be understood to refer to the total length of the rubber boot. The term "strain relief," essential to preserve the mechanical and electrical integrity and overall performance of spliced optic fiber cables, shall be understood to refer to relief of stress and tension, in an optic fiber, that could cause damage to the fiber cable or the connection between the connector and the cable.

The term "FC" shall be understood to refer to an optic fiber cable connector using a threaded plug and socket. For bi-directional transmission, two optic fiber cables and two FC connectors are used. The term "SC," an acronym for a standard connector and/or a subscriber connector, shall be understood to refer to an optic fiber cable connector using a push-pull latching mechanism resembling common audio and video cables. For bi-directional transmission, two optic fiber cables and two SC connectors (aka dual SC) are used. The term "LC," an acronym for Lucent connector, shall be understood to refer to a miniature version of an optic fiber SC connector. While an LC connector resembles an SC connector, with an LC connector being half the size, an LC connector thus has a 1.25 mm ferrule instead of a 2.5 mm ferrule. The term "ST," also referred to as a straight tip connector, the original de facto "standard" connector for commercial optic fiber cable wiring needs, shall be understood to refer to an optic fiber cable connector having a bayonet plug and a socket. Bi-directional transmission requires two fiber cables and two ST connectors.

The term "MPO" refers to an industry acronym for a "multi-fiber push on" connector, used by technicians and persons of ordinary skill in this field. The MPO connector was developed to provide multi-fiber connectivity in a single connector to support high bandwidth and high data density applications. While present fiber counts for MPO connectors are 12 and 24 optic fibers per connector, fusion splicers presently commercially available can only splice 12-fiber count MPO connectors.

The term "MTP," also used by technicians and persons of ordinary skill in this field, shall be understood to refer to an assortment of high-performance MPO connectors with special enhancements engineered to provide MTP connectors with optical and/or mechanical performance improvements in comparison to ordinary MPO connectors. In 1996, "MTP" a federally-registered trademark owned by US Conec and used in relation to a family of advanced MPO connectors designed for 4-, 8-, and 12-fiber ribbon applications, was released to the US market. In that same year, the International Electrotechnical Commission standardized this MPO format.

As a result there are five types of optic fiber connectors: FC (single fiber); LC (single fiber); SC (single fiber); ST (single fiber); and MPO/MTP (12 or more fibers).

Current attempts to permanently join two optic fibers end-to-end, enabling optical light signals to pass from one optic fiber to another with minimal loss, will occasionally result in a "failure." Such failure may occur when an optic fiber end portion is poorly cleaved by a cleaving mechanism; may occur when an optic fiber end portion has a crack in it; may occur when an optic fiber end portion is dirty; may occur when a fusion splicer over-arcs by accident and damages an optic fiber end portion; may occur when a given length of optic fiber is not properly arranged in the grooves of a cable splicer; or may occur when a portion of the length of optic fiber has a bend in it and a fusion splicer camera cannot focus upon the optic fiber.

However, using a fusion splicer to re-join optic fiber end portions resulting from such failure is currently impractical, based on current fiber-joining techniques.

Since I did not find a commercial product that addresses the failure problem noted and enables a fusion splicer easily to re-join optic fiber end portions resulting from such failures, I reviewed US patents and published applications for a solution.

U.S. Pat. No. 4,728,170 to Robertson discloses a process whereby a single mode optical fiber preset attenuator is made by forming a fusion splice between a length of silica fiber possessing no internal waveguiding structure to a length of single mode optical fiber, then cutting the silica fiber to a predetermined length to form a short stub that is next fusion-spliced to a second length of single mode fiber.

U.S. Pat. No. 5,993,071 to Hultermans discloses an adapter used to connect a first optical fiber connector to a second optical fiber connector. The adapter makes it possible for optical fiber connectors with perpendicular and inclined end faces to be interconnected or connected to a corresponding different optical fiber system.

U.S. Pat. Nos. 6,805,491 and 6,955,478, both to Durrant et al., are directed to a device which includes a stub and an optical fiber. The stub has an aperture and includes a first end and a second end. The optical fiber, located in the aperture, has a first end and a second end. The first end of the optical fiber is polished and made flush with the first end of the stub. The second end of the optical fiber is cleaved at a predetermined position, to provide a predetermined length for the optical fiber measured from the first end to the second (i.e., opposite) end of the optical fiber.

U.S. Pat. No. 7,178,990 to Cavey et al. is directed to a fiber optic stub fiber connector used for reversibly and nondestructively terminating an inserted field fiber having a buffer over a portion of it. The connector includes a housing and a ferrule including a stub fiber disposed within and extending from a bore through the ferrule. The ferrule is partially disposed within and supported by the housing. The connector includes a reversible actuator adapted to nondestructively and reversibly terminate a connection between the field fiber and the stub fiber. The reversible actuator has a buffer clamp to engage with the buffer to simultaneously provide a reversible and nondestructive strain relief to the terminated field fiber.

U.S. Pat. No. 7,186,035 to Dunn et al. is directed to an optical fiber connector having a receptacle or socket which includes a recessed optical fiber ferrule assembly for aligning an optical fiber within the connector. Recessed within the socket is a sleeve for receiving and bringing into optical alignment the optical fiber ferrule assembly, located at an internal end of the socket, with a similar optical fiber ferrule assembly of an optical plug which is connected to the optical socket.

U.S. Pat. No. 7,261,473 to Owen et al. discloses an optical sub assembly that provides electrical isolation between a receptacle having a nose for receiving an optical fiber and a package housing an optical device. The nose houses a ferrule containing a fiber stub optically aligned with an optical device housed in a package before securing the receptacle to the package. The electrical insulation is provided between the nose and the package by a sleeve extending along a middle portion of the ferrule and an insulating portion located between the sleeve and the nose.

U.S. Pat. No. 7,956,992 to Watt et al. is directed to a method for testing optical fiber connection quality of an optical drop fiber between a telecommunications system and a subscriber connection box in a multi-dwelling unit or other subscriber premises before connection to other subscriber equipment. An end portion of an optical fiber to-be-tested is placed in a fiber-holding device. The fiber-holding device holds the fiber end portion in alignment with a suitable reflective body. An optical signal is provided from the system direction which is reflected by the reflective body back towards the system. The reflected signal is detected by a suitable instrument, such as an optical time domain reflectometer, to confirm acceptable signal quality of the optical path between the system and the fiber end.

U.S. Pat. No. 8,556,521 to Everett et al. is directed to an optical connector for use in a fiber optic communications system, and to an expanded beam optical connector for connecting optical fibers. The connector comprises a housing, a port for receiving an optical fiber end, a cylindrical ferrule within the housing having opposite first and second ends, and an optical fiber stub held within the ferrule and extending between the ferrule ends. A sleeve surrounding the ferrule extends towards the port away from the second ferrule end to present an open end to the sleeve for receiving a termination ferrule of an optical fiber inserted into the port.

U.S. Pat. Nos. 9,557,492 and 9,897,770, both to Park et al., are directed to a hybrid optical fiber stub device comprising a first ferrule transparent to UV light and a second ferrule. An optical fiber is disposed through the first and second ferrules. The input and output faces of the optical fiber, when properly prepared, are suitable for optical coupling. A photonic device is coupled to the first optical fiber surface. A UV-curable epoxy is disposed between the photonic device and the first optical fiber surface. The UV-curable epoxy has an index of refraction that ranges from an index of refraction of the first optical fiber to an index of refraction of the photonic device. A second optical fiber is coupled to the first optical fiber.

U.S. Pat. No. 10,345,536 to Shao et al. is directed to an optical fiber connector, comprising: a housing, a ferrule within the housing; an end sleeve connected to a rear end of the housing; and an optical cable clamp inserted within the end sleeve. The clamp is provided for the purpose of clamping an optical cable. The optical cable is secured within the optical cable clamp. The optical cable clamp is inserted and secured within the end sleeve. The optical fiber of the optical cable is inserted within the housing and butt-joined with the embedded optical fiber in the ferrule.

U.S. Pat. No. 10,473,859 to Chabot et al. is directed to fiber optic connector comprising a fusion assembly for strengthening a splice point. The fusion assembly comprises an elongate mechanical support positioned adjacent the splice point and snugly encased by a flexible tube. A meltable adhesive in the form of a hollow tube is positioned over the splice point and the flexible tube comprises a heat shrinkable material. The elongate mechanical support comprises an elongate plate having a concave surface positioned adjacent the splice point and a C-shaped cross section.

U.S. Pat. No. 10,761,277 to Durrant is directed to a vent or slot, which is provided between the ferrule and the stub body, for enabling gases generated from a low melting glass sealing process of an optical fiber to the ferrule stub to escape.

US published application 2013/0004128 to Zhang discloses a device that enables a physical contact fiber optic connector into an expanded beam connector. The device includes a fiber stub, an aspherical lens, and a housing. The fiber stub includes a stub body and a predetermined length of optical fiber retained that is by the stub body. The housing retains the fiber stub and aspherical lens so that the length of optical fiber of the fiber stub is in optical communication with the lens.

US published application 2021/0103097 to Wang is directed to a low-profile splice protection system for protecting multi-fiber fusion splice sites. The splice protection system includes coating material to package a splice site, and a housing.

U.S. Pat. No. 8,043,013 to Lichoulas et al. discloses a splice-on connector system including a connector body, and an incoming fiber spliced to the connector body. The system also includes a splice sleeve for covering a splice point at which the incoming fiber is spliced to the connector body, and an extender tube covering the splice sleeve. Also disclosed is a method of producing the splice-on connector.

U.S. Pat. No. 10,770,831 to Kralik discloses a cable connector assembly including a connector fitting having a first coupling portion and a second coupling portion, and a connector body having a connection portion coupled to the second coupling portion of the connector fitting. The connector body has a sleeve interface portion formed about an outer surface of the connector body. An elongate compliant sleeve has a connector interface portion coupled to the sleeve interface portion of the connector body to form a coupling interface having a keyed profile.

However, these US patents and published applications do not provide solutions to problems occurring when an optic fiber end portion is poorly cleaved by a cleaving mechanism, when an optic fiber end portion is cracked, when an optic fiber end portion is dirty, when a fusion splicer accidentally over-arcs and damages an optic fiber end portion, when a given length of optic fiber is not properly arranged in grooves of a cable splicer, or when a portion of the length of optic fiber is bent and the fusion splicer camera, as a result, cannot focus upon the optic fiber.

To solve these problems, I increased optic fiber stub length extending from the connector by increasing a length of the associated rubber boot. One advantage of increasing the rubber boot length is that a longer optic fiber stub length eliminates a need for different connector holders relative to a fusion splicer. Connector holders are expensive and not universal to different types of connectors or fusion splicers. My design only requires a cable holder for an optic fiber stub, a simpler design. Another advantage is that a longer fiber stub length provides up to three opportunities to splice optic fiber ends correctly instead of the current single opportunity to splice correctly, thus saving money on "failed-splice" connections. Still another advantage of my solution to these problems is that an increased boot length better protects optic fiber within the boot, which improves fiber strain relief.

SUMMARY

A method of re-splicing a splice-on connector ("SOC") in accordance with the present subject matter is summarized by the following five steps: (1) stripping insulation away from an end portion of a first optic fiber; (2) stripping insulation away from an end portion of a second optic fiber having a connector body fixed to an opposite end portion thereof, wherein an end portion of the connector body is dimensioned and configured to be removably insertable into an end portion of an elongated hollow member; (3) splicing together the first and second fiber optic end portions to produce a splice-on connector ("SOC") or a re-spliced splice-on connector ("RSSOC"), wherein the SOC has a predetermined length to enable cutting at three predetermined locations spaced from the connector body; (4) if an operational fault is caused in a system using the SOC or RSSOC, cutting the SOC or the RSSOC at one of the three predetermined regions; and (5) repeating step (3).

Additional features of the present subject matter are directed to an elongated optic fiber stub portion. Such an optic fiber stub portion results from using an elongated hollow elastomeric tubular member, also known as a rubber boot, preferably made of silicone rubber, in connection with another method for fusing two end portions of optic fiber together, which includes the following steps.

A first step involves passing an end of a first optic fiber having an insulation layer through the elongated tubular member and then through a heat-meltable sleeve. A second step involves stripping away the insulation layer from an end portion of the first optic fiber. A third step involves cleaning the insulation-stripped end portion with an effective amount of cleaning fluid and then cleaving an end face of the cleaned end portion of the optic fiber. A fourth step involves positioning the cleaved end face of the cleaned end portion of the first optic fiber in a fusion splicer. A fifth step involves stripping an insulation layer from an end portion of a second optic fiber. The second optic fiber includes an optic fiber connector that is attached to an end portion opposite the insulation-stripped end portion. A sixth step involves cleaning the second optic fiber end portion stripped of insulation with an effective amount of cleaning fluid and thereafter cleaving an end face of the cleaned end portion of the second optic fiber. A seventh step involves positioning the second optic fiber cleaved end portion in the fusion splicer closely adjacent, preferably abutting, the cleaved end portion of the second optic fiber. An eighth step involves fusing together the cleaved end faces of the first and second fibers.

A ninth step involves moving the sleeve made of meltable plastic over the fused-together end portions of the first and second optic fibers and then inserting the sleeved portion of the fused first and second fibers into an oven to melt the sleeve for the purpose of protecting the fused-together portions of the fibers. The elongated tubular member has opposite end portions; and one end portion of the elongated tubular member defines a tip. A tenth step involves sliding the hollow elongated tubular member over the sleeve-protected fused ends of the first and second optic fibers and attaching the end portion of the elongated tubular member that is located opposite the tip to the optic fiber connector. The elongated tubular member has a length effective for resulting in the sleeve-protected fused optic fibers disposed therein, to be cut near the tubular member tip, for producing an elongated optic fiber stub portion of the present subject matter. When the eighth step results in a failure to fuse abutting end faces of the first and second optic fibers, the second through eighth steps are repeated, and the ninth and tenth steps performed, whenever successful fusion of end faces of the two optic fibers occurs.

BRIEF DESCRIPTION OF THE DRAWINGS

Throughout the drawing figures and detailed description, I shall use similar reference numerals to refer to similar components of the present subject matter.

DETAILED DESCRIPTION

Figure 1A:
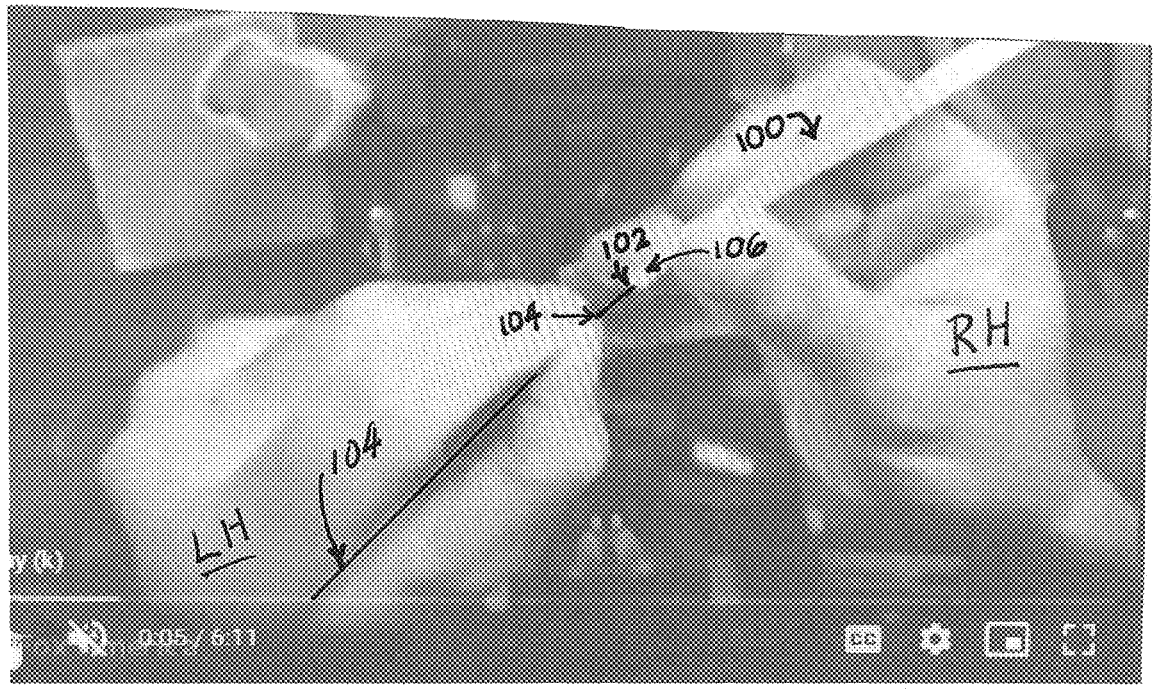
FIGS. 1A, 1B, 1C and 1D are screen shots of a video of step 1 of a method demonstrating the fusing of two cleaved

A method of re-splicing a splice-on connector ("SOC"), in accordance with the present subject matter includes the following steps: (1) disposing an end portion of a first optic fiber into and longitudinally through one end portion of an elongated hollow member such that the first fiber end portion extends from an opposite end portion of the hollow member; (2) stripping insulation away from the end portion of the first optic fiber; (3) cleaning the insulation-stripped end portion of the first optic fiber with a preselected cleaning fluid to provide the first fiber with a clean end face; (4) cleaving the first optic fiber clean end face to provide a cleaved end portion; (5) positioning the first optic fiber cleaved end portion within a fusion splicer; (6) stripping insulation away from an end portion of a second optic fiber having a connector body fixed to an opposite end portion thereof, wherein an end portion of the connector body is dimensioned and configured to be removably inserted into the opposite end portion of the hollow member; (7) cleaning the insulation-stripped end portion of the second optic fiber with a preselected cleaning fluid to provide the second fiber with a clean end face; (8) cleaving the second fiber clean end face to produce a cleaved end portion; (9) closely spacing the cleaved end portions of the first and second optic fibers; (10) using the splicer to splice together the closely spaced cleaved end portions of the optic fibers, to thereby produce either a splice-on connector ("SOC") or a re-spliced splice-on connector ("RSSOC"), wherein the SOC has a predetermined length effective for cutting the SOC or the RSSOC at three predetermined locations spaced seriatim from the connector body; (11) positioning a heat-meltable sleeve relative to the spliced-together first and second optic fiber end portions such that the sleeve encloses the first and second optic fiber spliced-together end portions, wherein the sleeve is sized and configured to fit within an interior region of the hollow member; (12) inserting the spliced-together fiber end portions enclosed by the sleeve into an oven having an interior heated to a predetermined temperature to cause the sleeve to melt onto the spliced-together optic fiber end portions; (13) moving the elongated hollow member relative to the spliced-together first and second optic fiber end portions such that the spliced-together optic fiber end portions are disposed within the hollow member interior region; (14) inserting the connector body end portion into the opposite end portion of the hollow member; (15) if an operational fault is caused in a system using the SOC or the RSSOC, removing the connector body end portion from the hollow member, (16) cutting the SOC or the RSSOC at one of the three predetermined regions; (17) using the fusion splicer to splice together closely-spaced other pairs of cleaned-and-cleaved end portions of the first and second optic fibers; and (18) repeating step (11) through step (14).

Figure 15:
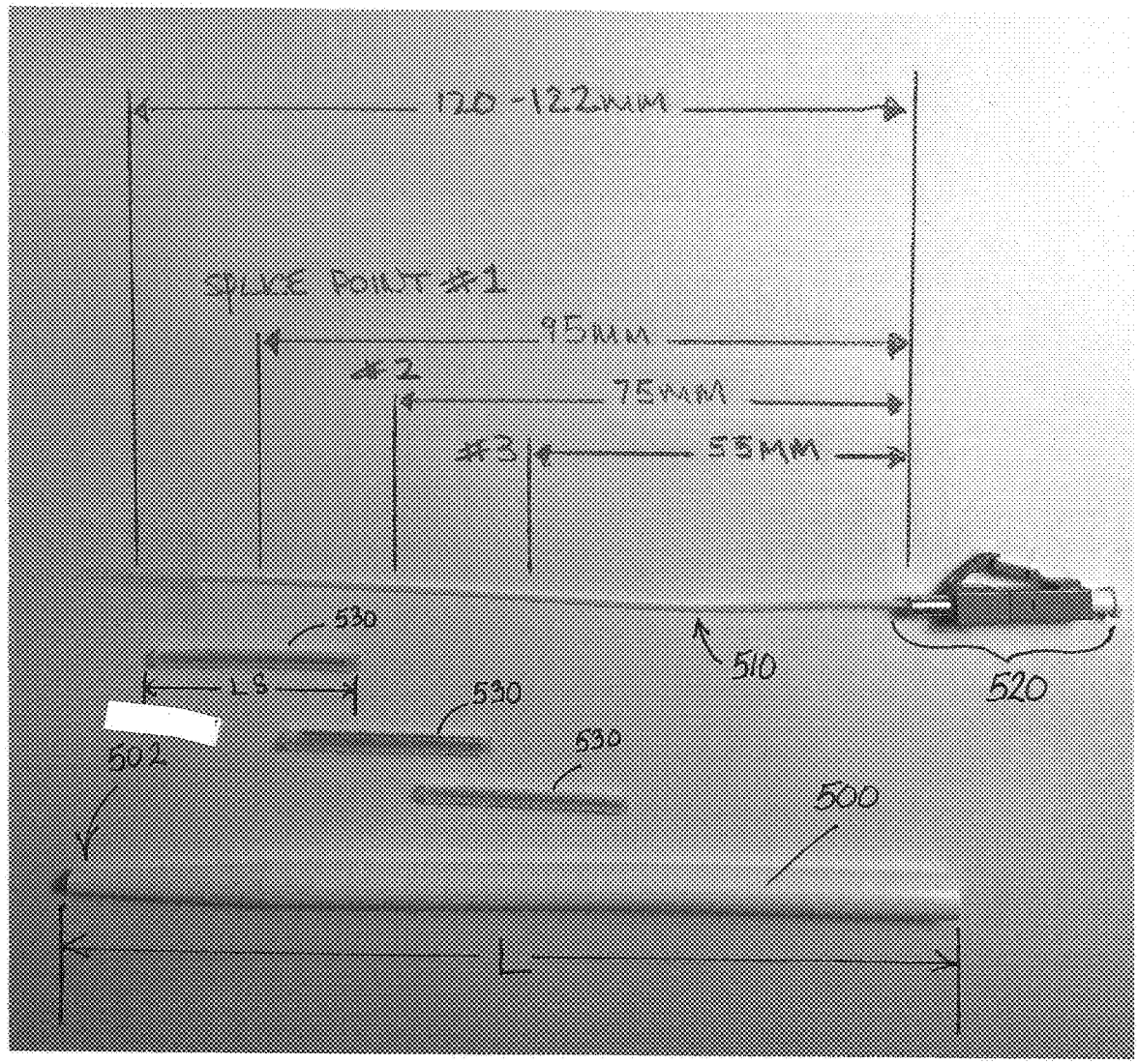
FIG. 15 depicts a splice-on connector in accordance with the present subject matter, and three preferred splice points spaced from an end of a connector body.

In the method described in the preceding paragraph, the hollow member 500 (please refer to FIG. 15) is essentially cylindrical, and one of its end portions 502 defines a frustoconical tip. Also, the second optic fiber 510 has a length ranging from about 120 millimeters ("mm") to about 122 mm; and a first one of the three predetermined locations is spaced from about 96 mm to about 94 mm (preferably about 95 mm) from the connector body 520; a second one of the three predetermined locations is spaced from about 76 mm to about 74 mm (preferably about 75 mm) from the connector body 520; and a third one of the three predetermined locations is spaced from about 56 mm to about 54 mm (preferably about 5 mm) from the connector body 520. In addition, the hollow member 500 has a length L ranging from about 137.8 mm to about 140.0 mm; and the sleeve 530 is cylindrical with a length LS ranging from about 31.1 mm to about 31.6 mm.

Additional features of the present subject matter are described as follows.

Figure 1B:
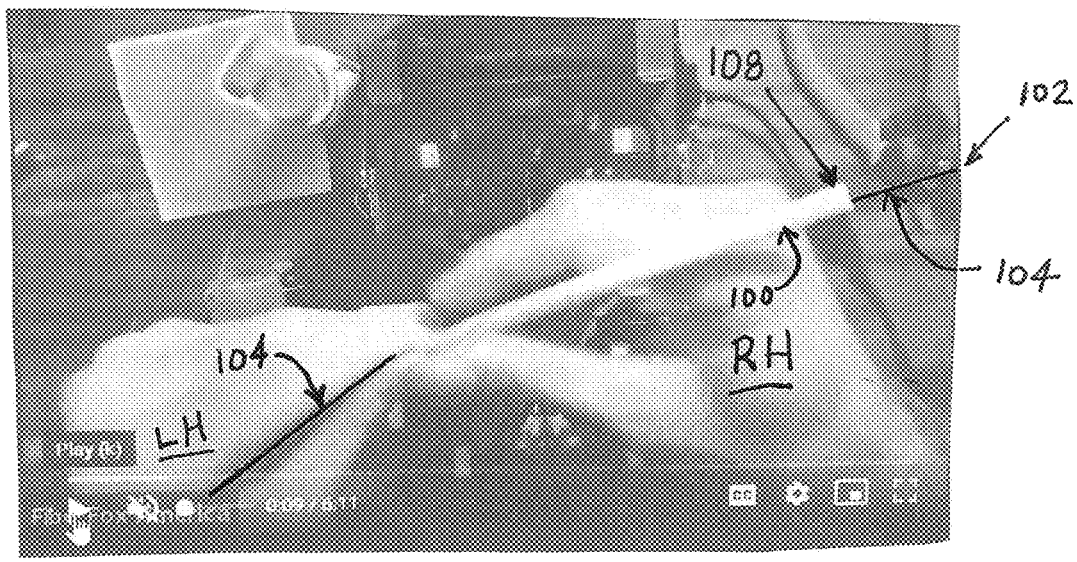
Figure 1C:
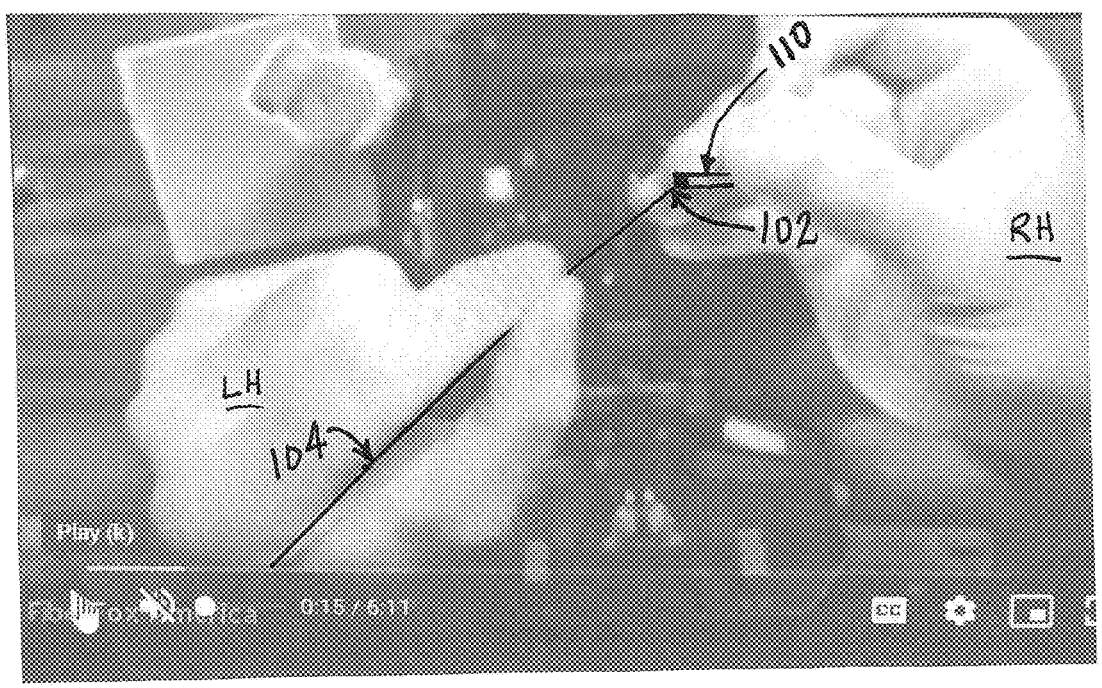
Figure 1D:
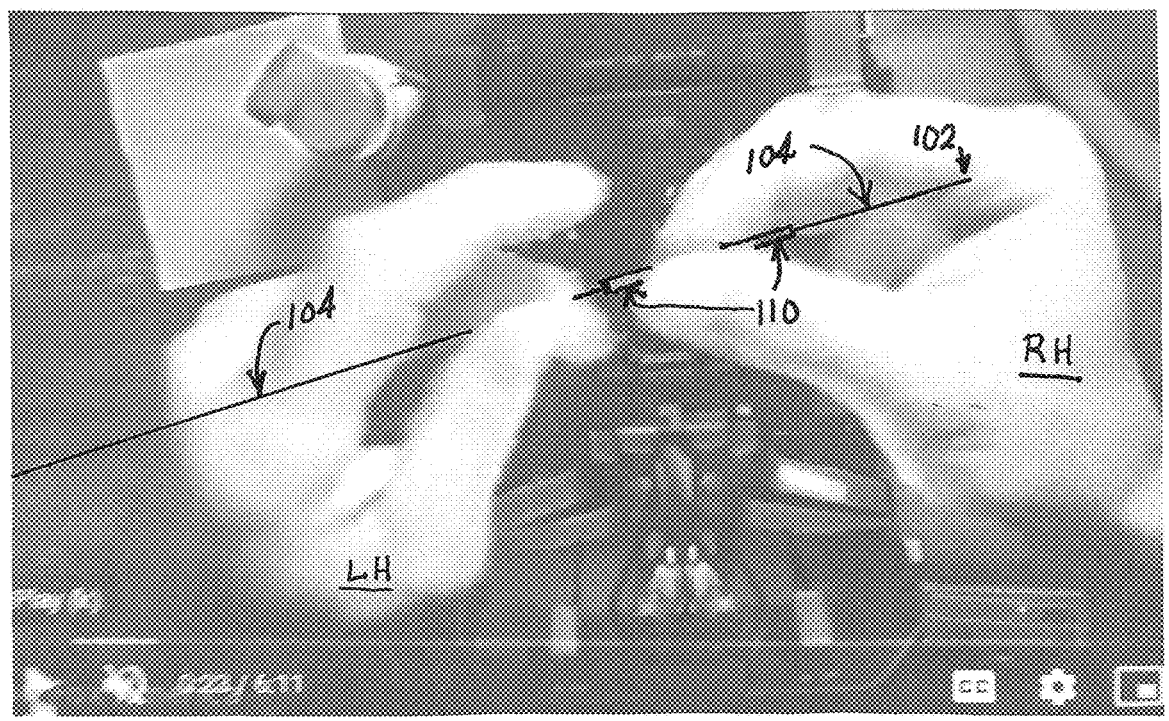

Step 1: Pass Optic Fiber End through an Elongated Boot and Plastic Sleeve. Please refer to FIG. 1A which shows a technician using his/her right hand RH to hold a hollow and elongated elastomeric tubular member made of rubber, known as a rubber boot 100 by those of ordinary skill in this field. The technician, shown holding in his/her left LH an end portion 102 of an optic cable 104, is inserting the end portion 102 of the optic cable 104 into an opening at a hollow tip 106 located at one end portion of the elongated elastomeric tubular member 100 preferably made of silicone rubber, which I refer to as a "rubber boot" throughout this patent application. FIG. 1B shows the end portion 102 of optic cable 104 extending from an opposite end 108 of the elastomeric tubular member or rubber boot 100 after the end portion 102 of optic cable 104 was pushed through the rubber boot 100. After the technician has pulled the end portion 102 of the optic cable 104 through the tubular member or rubber boot 100 and set the rubber boot 100 down to the left (beyond the field of view), FIG. 1C shows how the technician next uses his/her right hand RH to hold a clear plastic sleeve 110 and then insert with his/her left hand LH the end portion 102 of optic cable 104 into one end of the clear plastic sleeve 110. FIG. 1D shows the technician using his/her right hand RH to grip the plastic sleeve 110 and slide the plastic sleeve 110 to the left along optic cable 104.

Figure 2A:
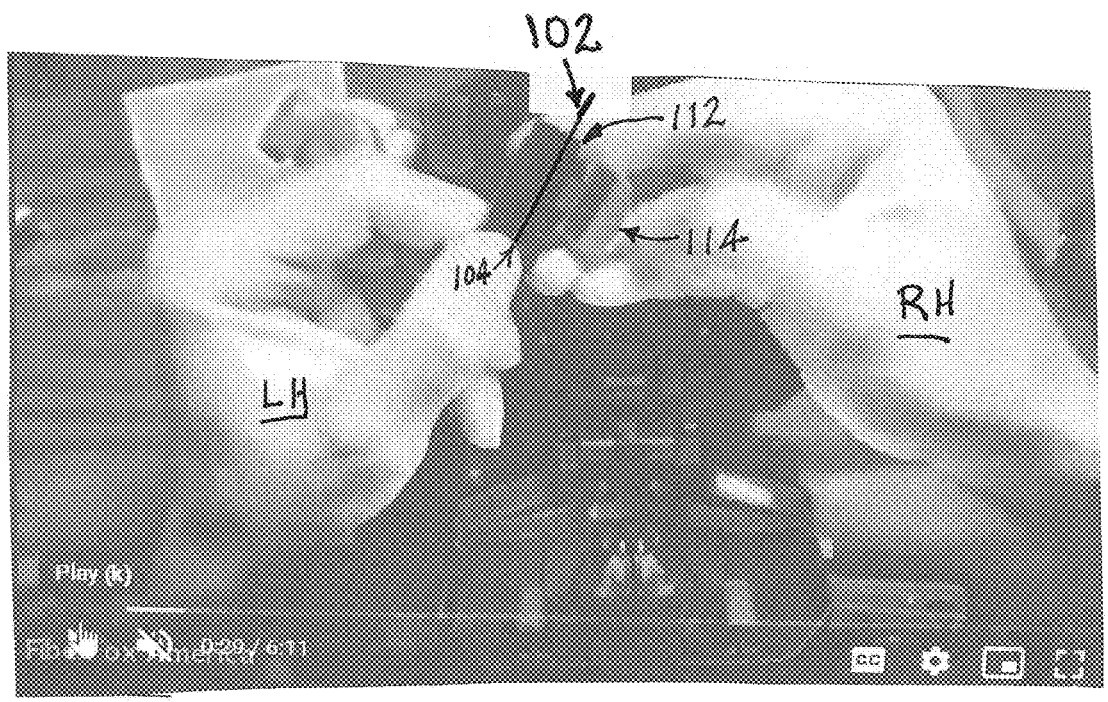
FIGS. 2A, 2B, 2C, and 2D are video screen shots of step 2 of the method.
Figure 2B:
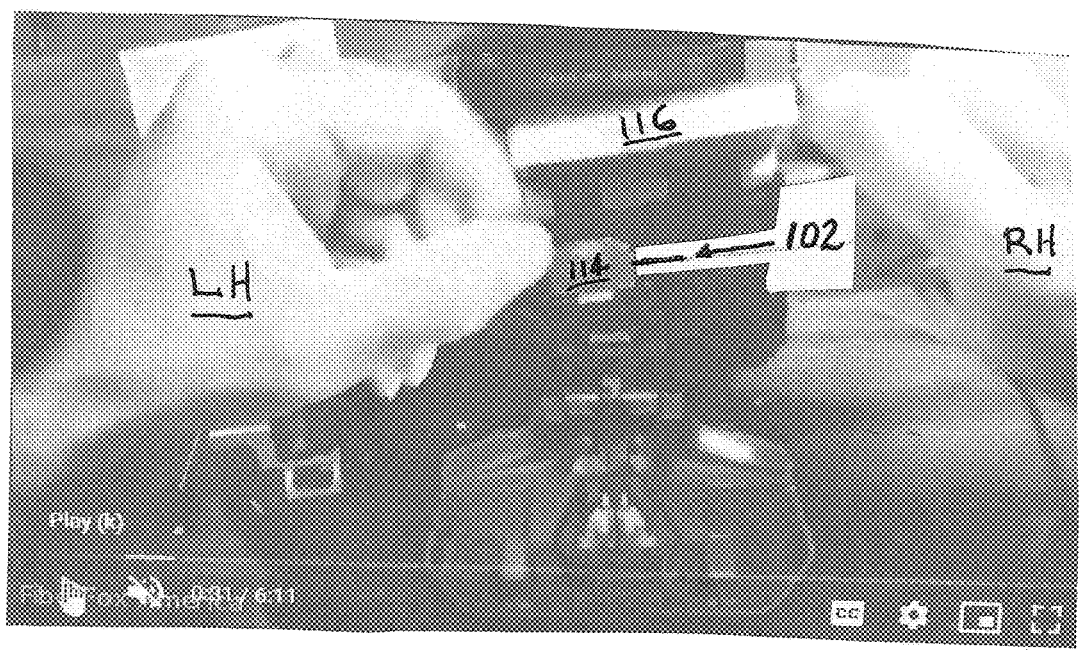
Figure 2C:
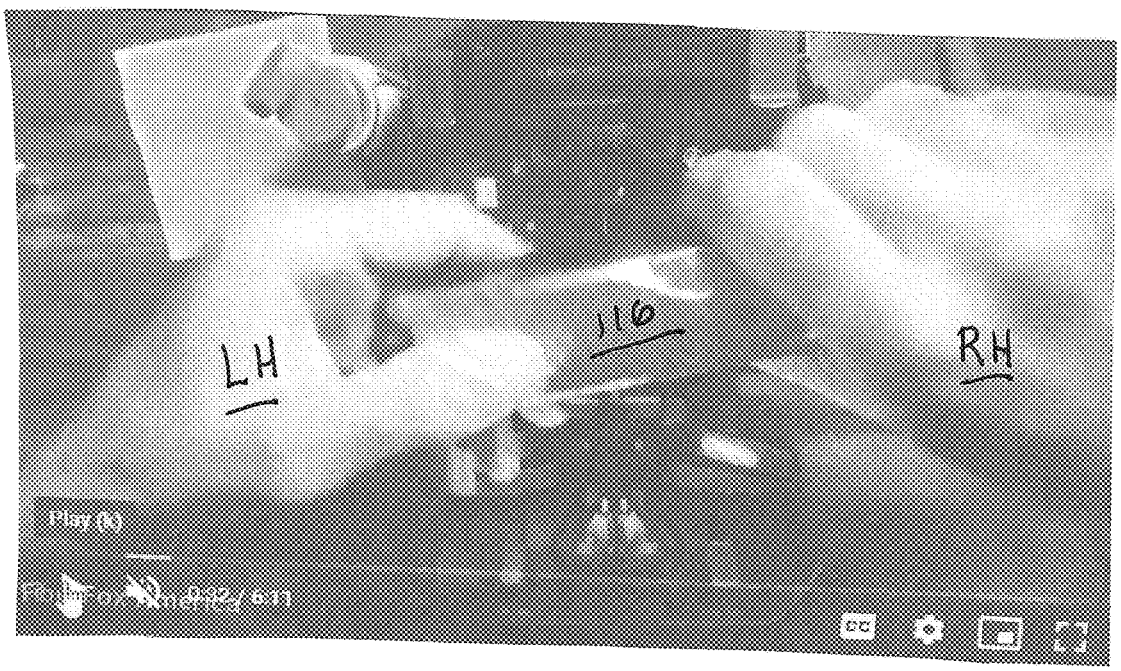
Figure 2D:
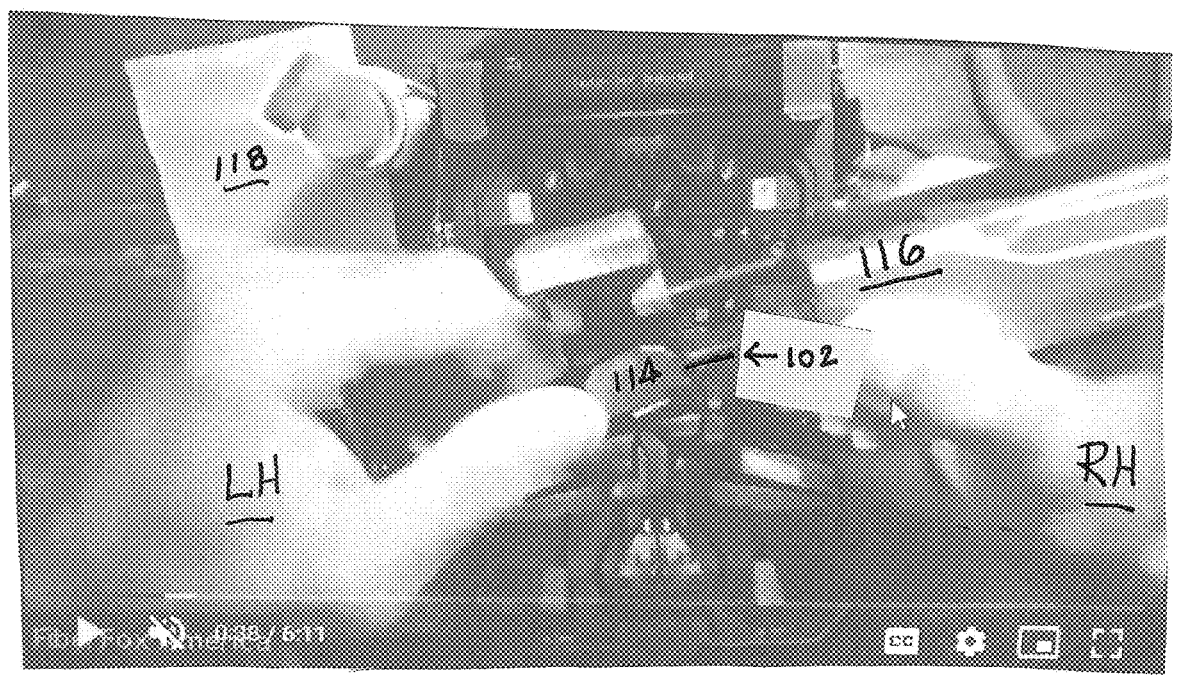

Step 2: Insert Optic Fiber into a Fiber Holder and then into Thermal Stripper. FIG. 2A presents the technician holding in his/her left hand LH a fiber holder 112 having a hinged cover 114. The technician first places the optic fiber 104 in the fiber holder 112 (see FIG. 2A), with the end portion 102 of the optic fiber 104 extending from about 1 inch to about 1.25 inches from the fiber holder 112. The technician thereafter uses the hinged cover 114 to secure the optic fiber 104 to the fiber holder 112, with the end portion 102 of the optic fiber 104 extending from about 1 inch to about 1.25 inches from the fiber holder 112. (Please see FIG. 2B.) The technician next places the fiber holder 112 (now clinching the end portion 102) into a thermal stripper 116 (Please refer to FIGS. 2B and 2C) to strip insulation from the end optic fiber 104 from the end portion 102. (Please refer to FIG. 2D.)

Figure 3A:
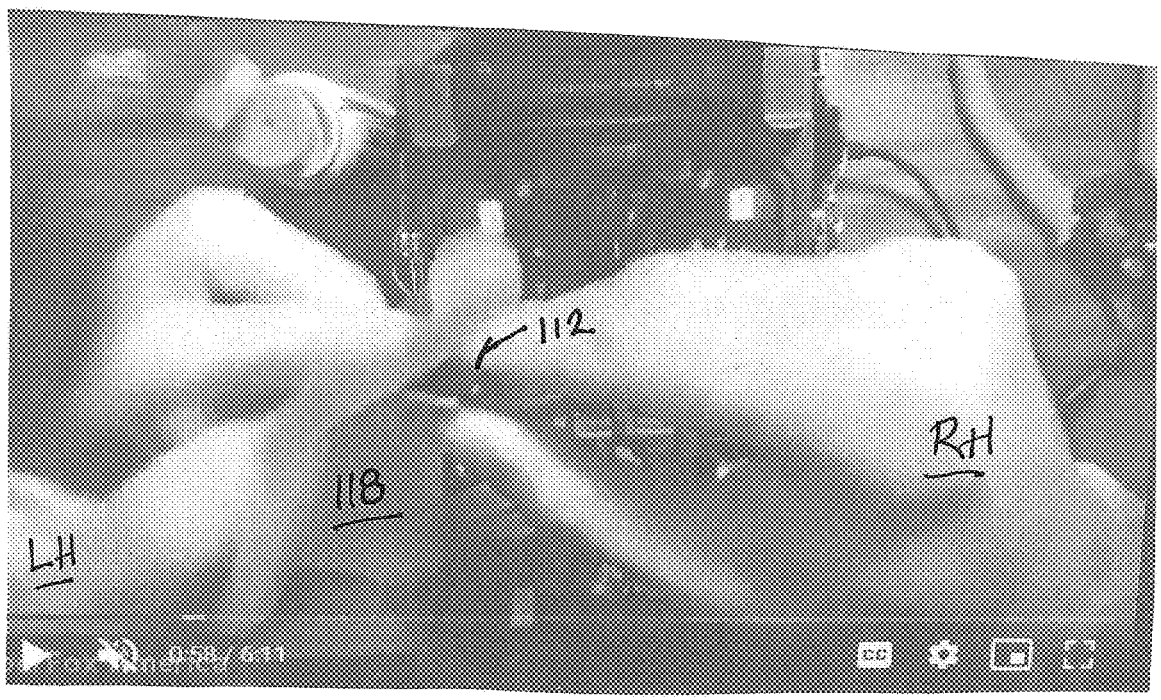
FIGS. 3A and 3B are video screen shots of step 3 of the method.
Figure 3B:
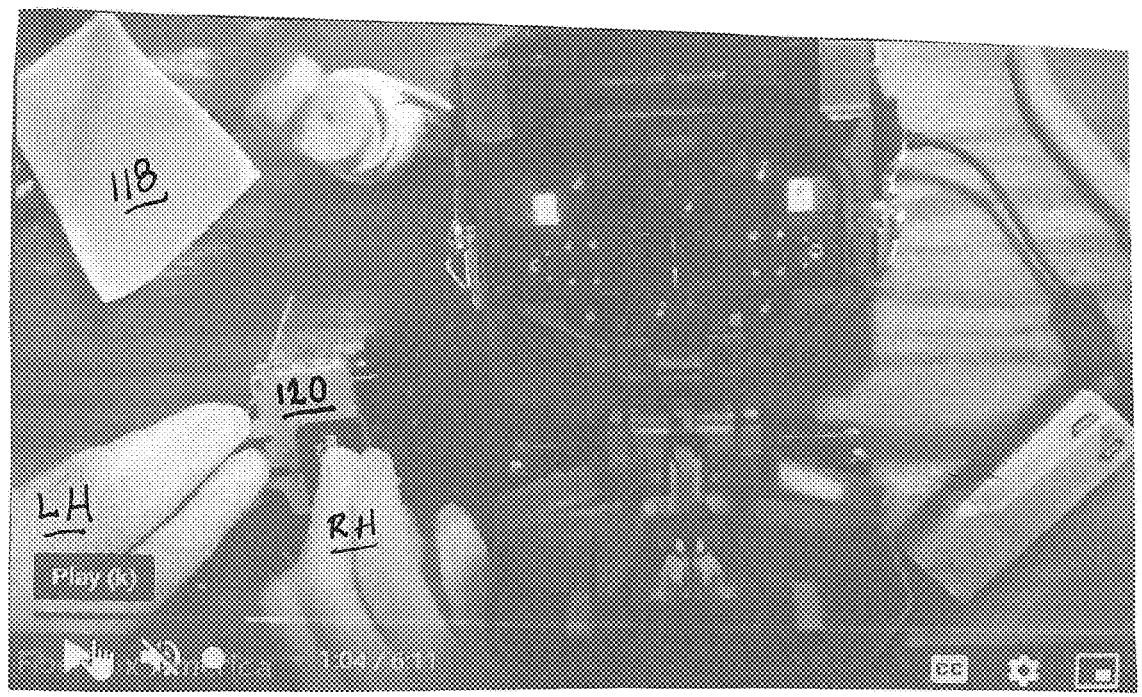

Step 3: Clean Optic Fiber with Cleaning Fluid and Cleave in Precision Cleaver. FIG. 3A shows the technician holding in his/her left hand LH a cleaning cloth 118 to which was applied a suitable cleaning fluid. The technician then uses the cleaning cloth 118 which has an effective amount of the cleaning fluid to clean the insulation stripped portion of optic fiber 104 (not shown) extending from the fiber holder 112. The technician next inserts the fiber holder 112 containing the optic fiber 104 with its now insulation-stripped and "cleaned" end portion 102 into a precision cleaver 120 to cleave the end face of end portion 102 (not shown). (Please see FIG. 3B.)

Steps 1-3 and figures associated with steps 1-3 represent preparation of an end face of the optic cable in accordance with the present subject matter, one advantage of which is a longer fiber stub length for the optic fiber, providing up to three opportunities to splice a connector correctly instead of the sole opportunity currently to splice optic fiber end faces correctly. Steps 4-8 that follow, and figures associated with steps 4-8, represent preparation of an end face of another optic fiber, to which the longer fiber stub end face can be joined up to three times if "failure" occurs, which results in reduced time and expense to correct such failure.

Figure 4A:
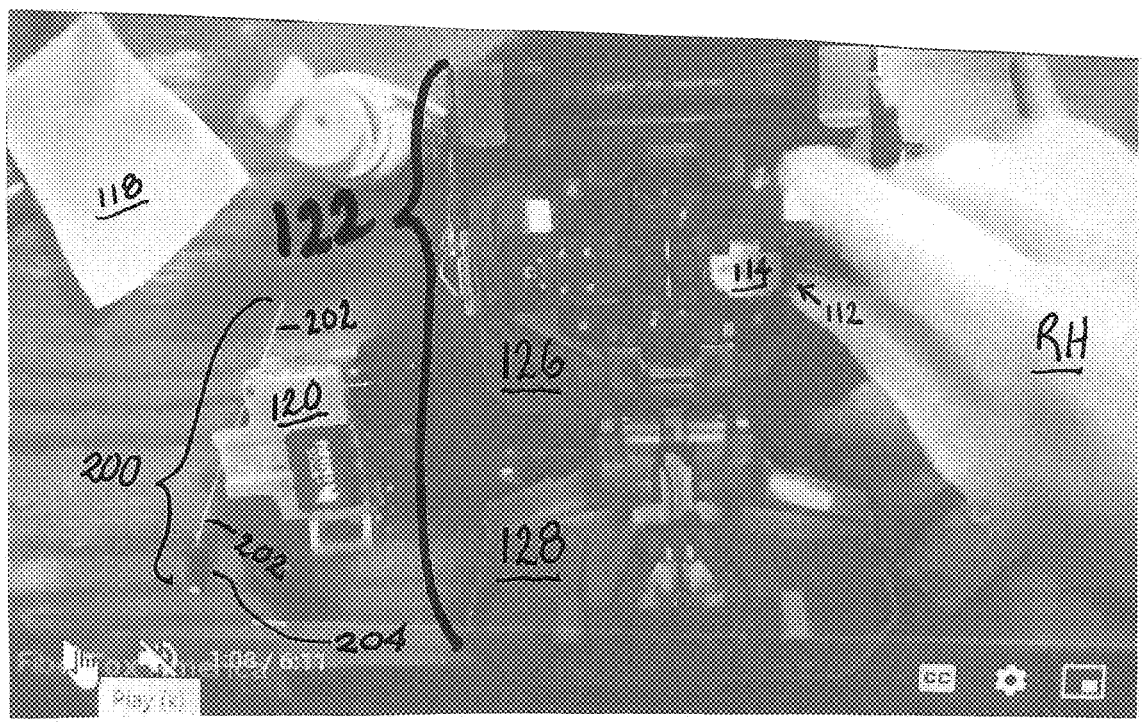
FIGS. 4A and 4B are video screen shots of step 4 of the method.
Figure 4B:
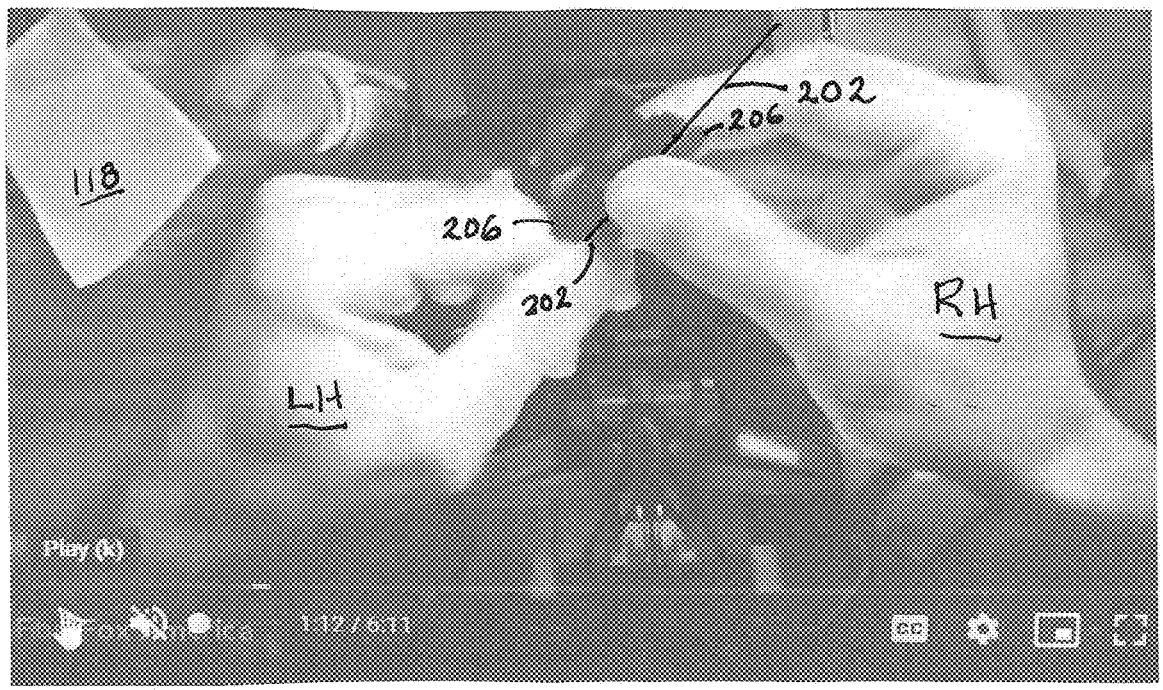

Step 4: Place Fiber Holder in Fusion Splicer; Then, Prepare Other Optic Fiber. Next, the technician is shown using his/her right hand RH to position the fiber holder 112 (now containing the freshly-cleaved end face of the optic fiber 104) within a fusion splicer 122. (Please refer to FIG. 4A.) Also, a pigtail assembly 200 for another optic fiber is prepared for a similar insulation-stripping procedure. The pigtail assembly 200 includes another optic fiber 202 extending from a back of an optic fiber connector 204 (FIG. 4A). To prepare to strip insulation from an end portion of the other optic fiber 202, the technician uses both hands to insert the connector pigtail assembly 200 (FIG. 4A) in another fiber holder 206 (FIG. 4B).

Figure 5A:
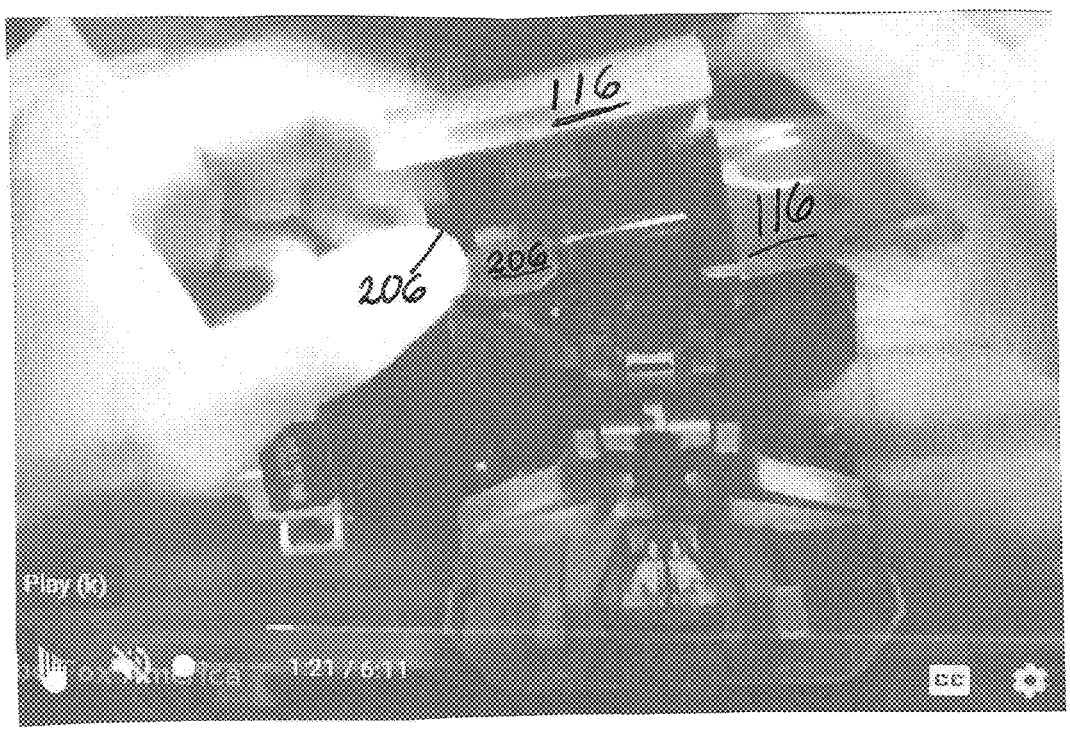
FIGS. 5A and 5B are video screen shots of step 5 of the method.
Figure 5B:
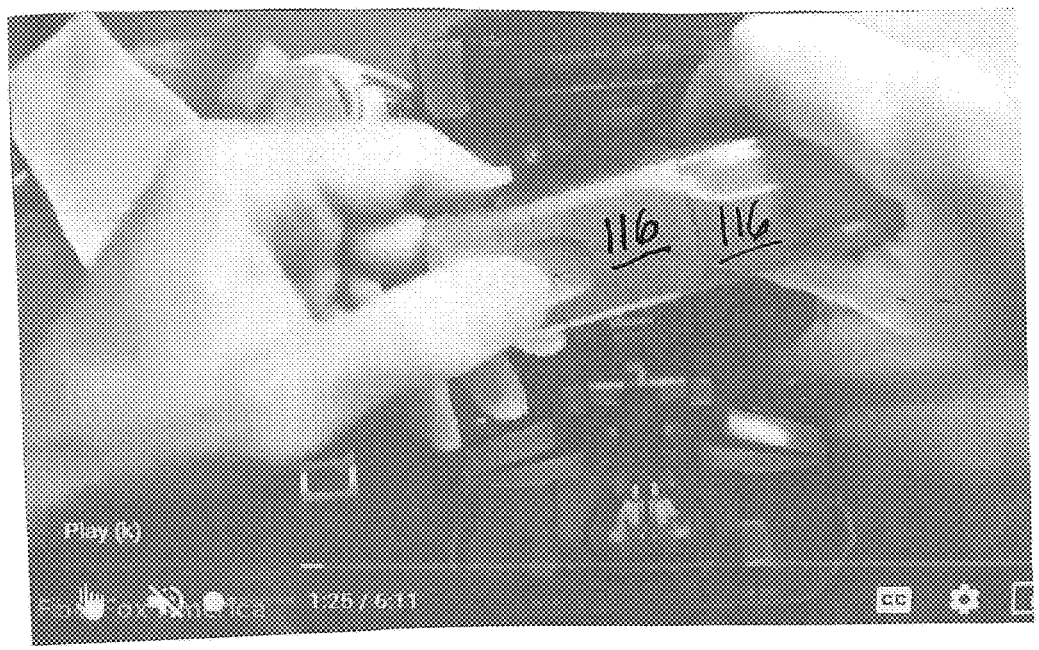

Step 5: Next, Place Fiber Holder into Thermal Stripper to Strip Off Insulation. Next, the technician places the other fiber holder 206 (containing the connector pigtail assembly 200—FIG. 4A) into the thermal stripper 116 (FIGS. 5A and 5B) to strip off insulation from an end portion of the other optic cable 202 (FIG. 4A).

Figure 6A:
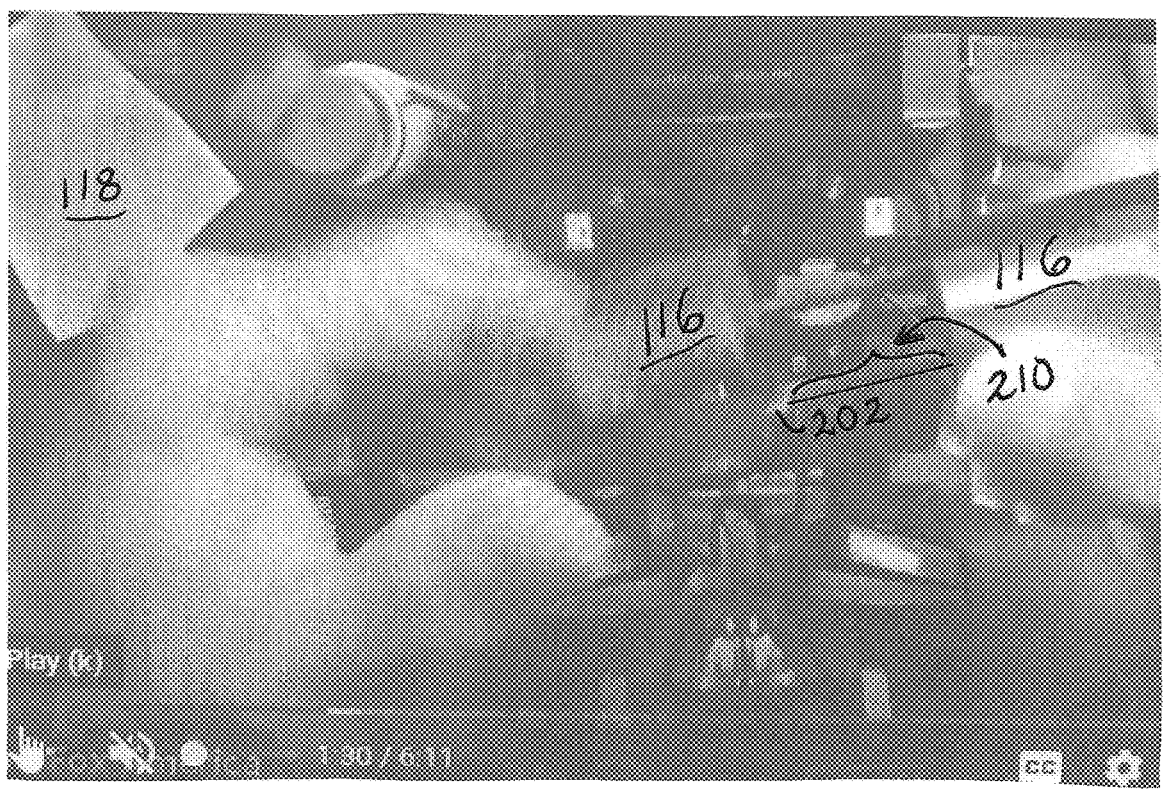
FIGS. 6A and 6B are video screen shots of step 6 of the method.
Figure 6B:
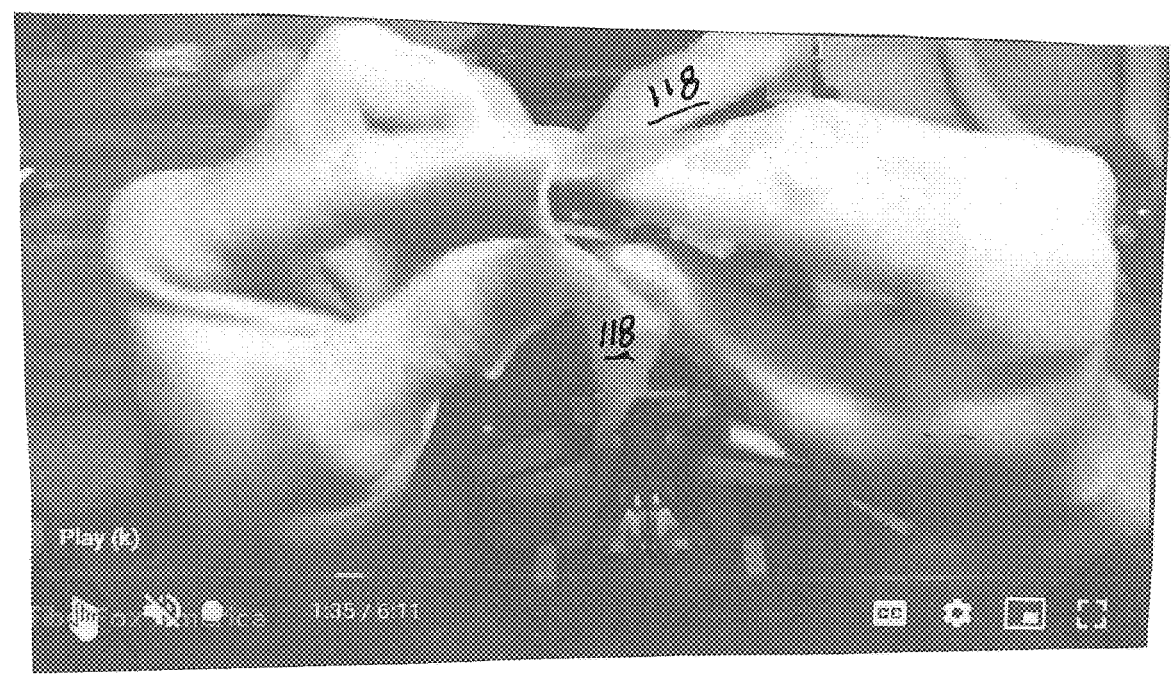

Step 6: Remove Other Optic Cable From Stripper and Clean End Portion. After insulation which had been on the end portion 210 of the other optic fiber 202 has been stripped away by operation of the thermal stripper 116 (FIG. 6A), the insulation-stripped end portion 210 of the other optic fiber 202 is cleaned by the technician using an effective amount of cleaning fluid on the cloth 118, for cleaning the insulation-stripped end portion 210 of the other optic fiber 202 (FIGS. 6A, 6B).

Figure 7A:
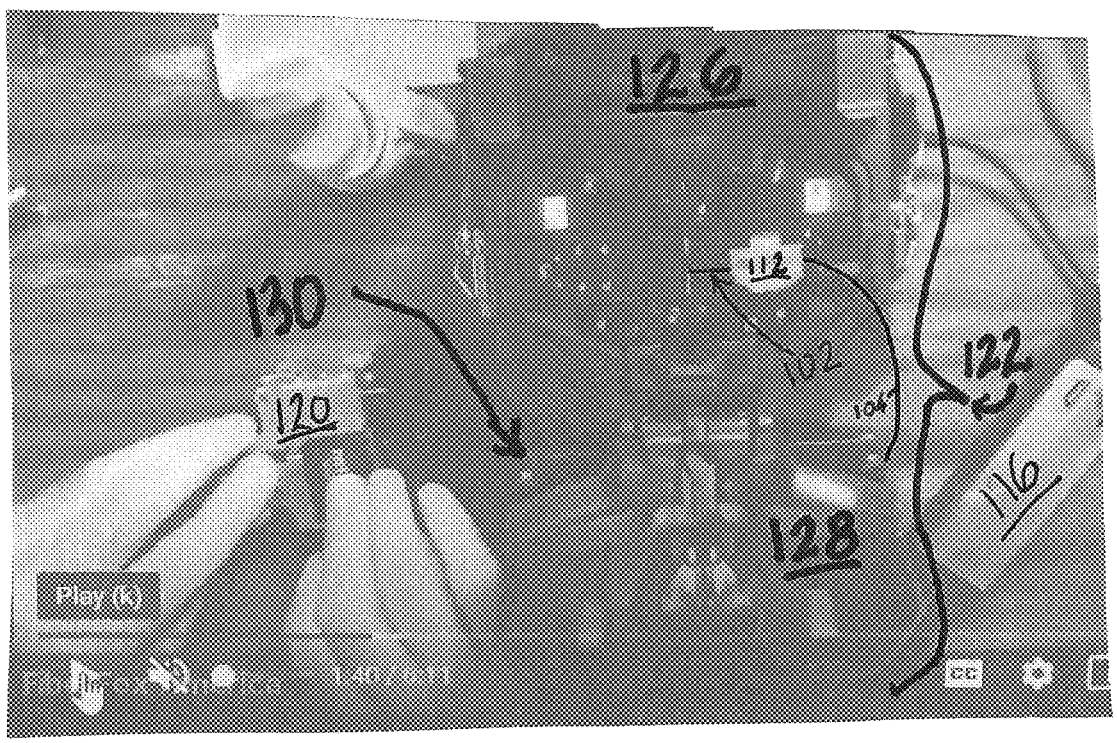
FIGS. 7A and 7B are video screen shots of step 7 of the method.

Step 7: Put Clean End Portion in Cleaver; Put Fiber Holder into Fusion Splicer. Next, the other fiber holder 206, which I shall now refer to as the "second" fiber holder 206 (containing the connector pigtail assembly 200 with its freshly-cleaned and insulation-stripped end portion 210 of the second optic fiber 202), is inserted into the precision cleaver 120 (please refer to FIG. 7A) by the technician for the purpose of cleaving the end face of the freshly-cleaned and insulation-stripped end portion 210 of the second optic fiber 202. Then, after the end face of the cleaned and insulation-stripped away end portion 210 of the other optic cable 202 has been cleaved by the technician using the precision cleaver 120 (please see FIG. 7A), the technician next inserts the second fiber holder 206 (containing the now-cleaved end face of the second optic fiber 202) into the fusion splicer 122 (see FIG. 7B).

Please note that the fusion splicer 122, at this time, also contains the fiber holder 112 (containing the cleaved end face of end portion 102 of optic fiber 104) that the technician inserted into fusion splicer 122 earlier. (FIG. 4A and step 4.)

Figure 7B:
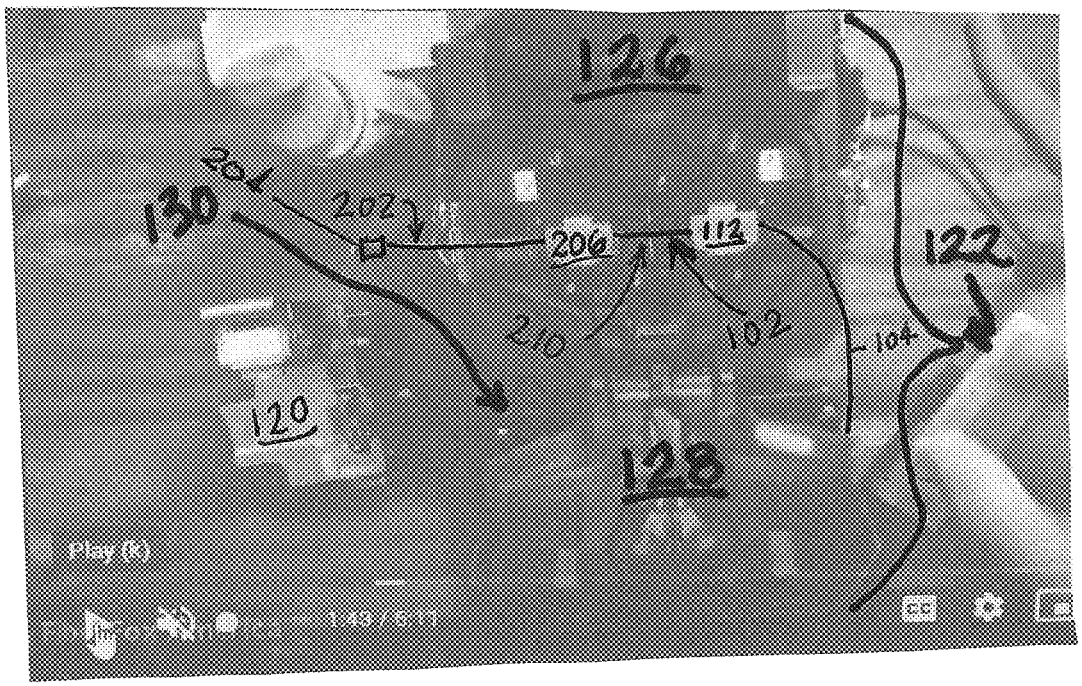

Also please note that the fusion splicer 122 includes an operational portion 126 (for fusing together the cleaved end faces of abutting optic fibers) and a cover portion 128 connected to the operational portion 126 by a hinged assembly that is unitary with both the operational portion 126 and the cover portion 128 (FIG. 7B).

Figures 8A, 8B:
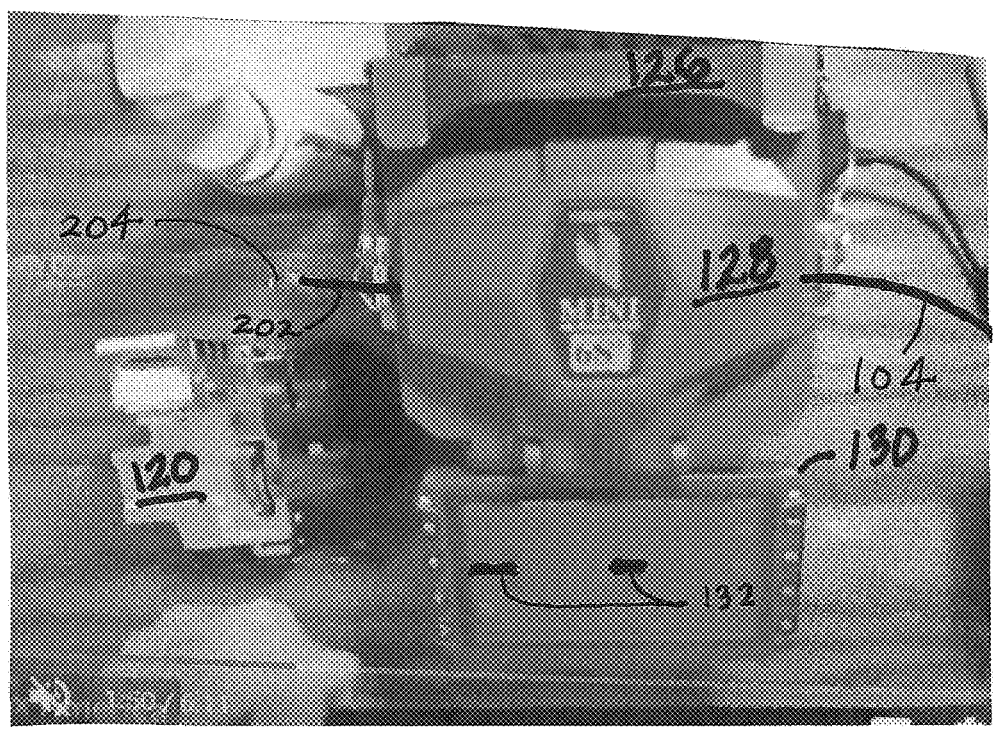
FIGS. 8A, 8B, 8C, and 8D are video screen shots of step 8 of the method.
Figure 8C:
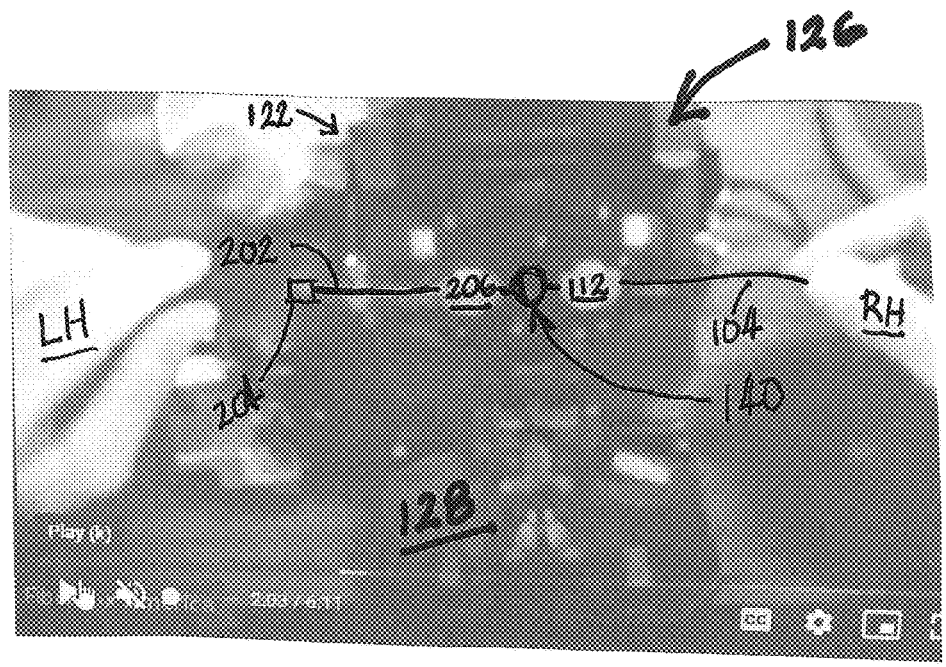
Figure 8D:
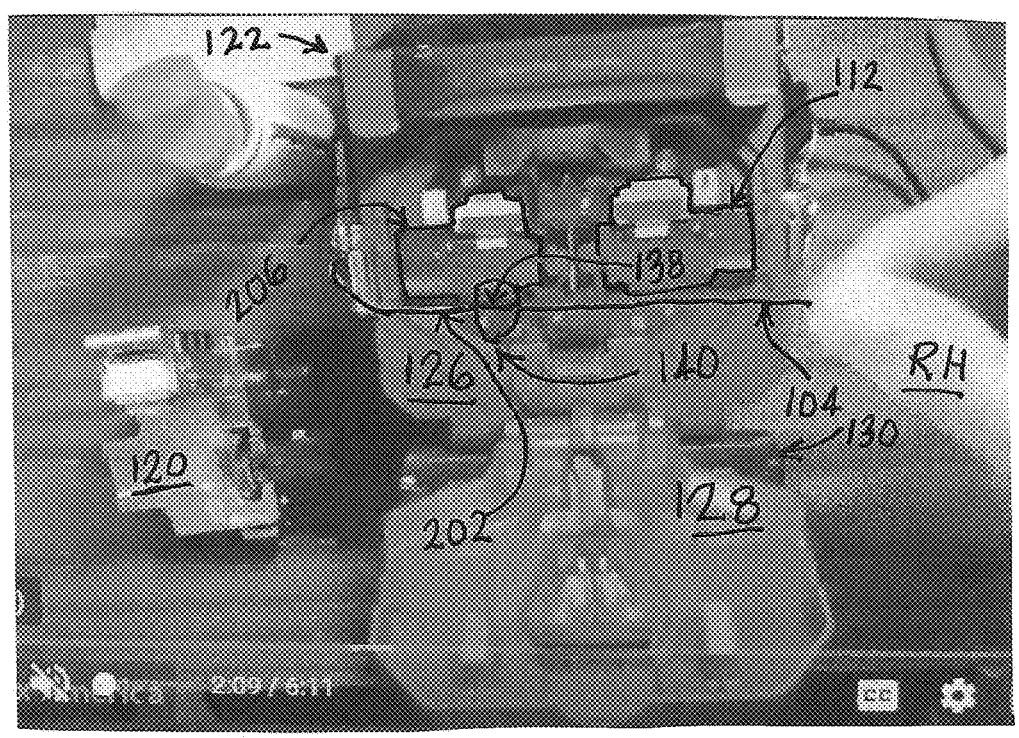

Step 8: Close Cover of Splicer and Fuse End Faces of Optic Fibers Together. Next, the cover 128 is closed over the abutting end faces of the first and second optic fibers 104 and 202 (FIG. 8A). Then, the fusion splicer 122 (FIG. 7A) is used by the technician to fuse the abutting end faces of the first and second optic fibers 104 and 202 together. A panel 130 associated with the fusion splicer 122 provides a visual assessment of the progress of the fusion of the abutting end faces of the first and second optic fibers 104 and 202. In particular, broken lines 132, when displayed on the panel 130 (FIG. 8A), indicate that fusion is "in progress," while a solid line 134 displayed on the panel 130 (FIG. 8B) indicates that fusion of abutting end faces is completed. The fusion splicer 122 indicates when end-face fusion of the two optic fibers is successful. An example of successful end-face fusion is as follows: After the panel 130 of the fusion splicer 122 indicates that end-face fusion of the two optic fibers 104 and 202 has been completed (FIG. 8B), the fusion splicer 122 is opened. Successful end-face fusion of the two optic fibers 104 and 202 is shown as having occurred (FIG. 8C), with the technician holding in his/her right hand RH the first optic fiber 104. In FIG. 8C, the first optic fiber 104 is shown as still retained by the first fiber holder 112. Also, the second optic fiber 202 is shown as still retained by the second optic fiber holder 206. In addition, the second optic fiber connector 204 is clearly shown attached to an end portion of the second optic fiber 202, which is opposite the fused end-face portion of the second optic fiber 202. In FIG. 8D, the first optic fiber 104, now removed from the first fiber holder 112, is shown being held in the right hand RH of the technician. Also shown is the second optic fiber 202, which is now joined to the first optic fiber 104 at a fused end-face plane 138, within a fused end-face region 140. (Please see FIG. 8D.)

Failure to Successfully Fuse Optic Fiber End Faces: Hypothetical Example 1. Yet, the fusion splicer 122 also notifies the technician when end-face fusion of the two optic fibers has "failed." Let us assume, therefore, that end-face fusion of the two optic fibers 104 and 202 has failed, and that corrective action is now required.

Figure 9A:
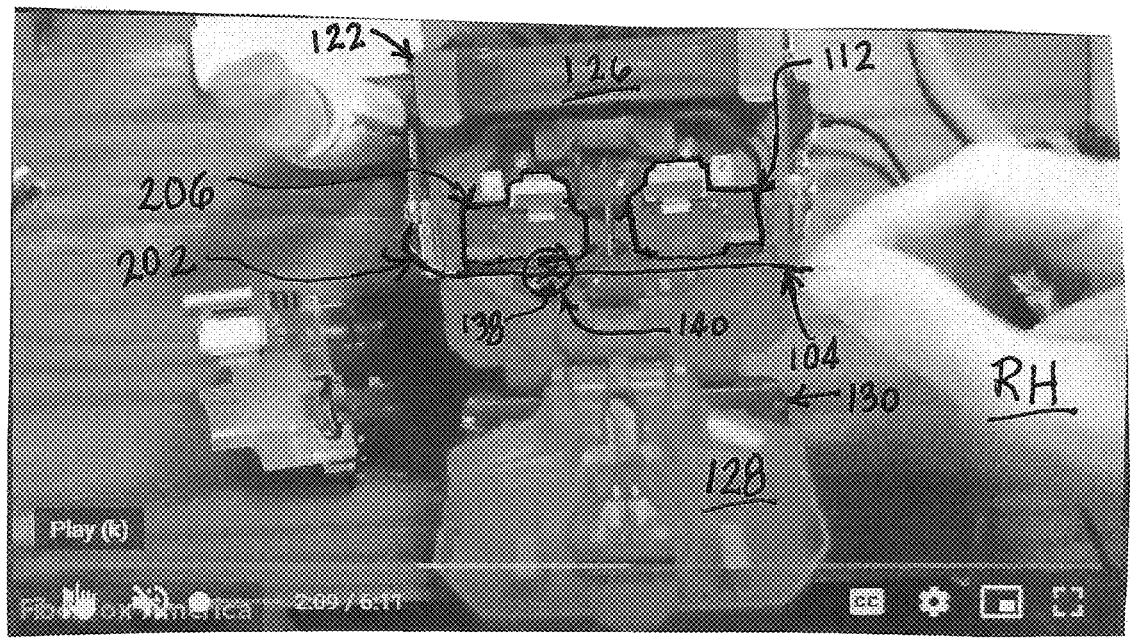
FIGS. 9A and 9B are video screen shots of step 9 of the method.
Figure 9B:
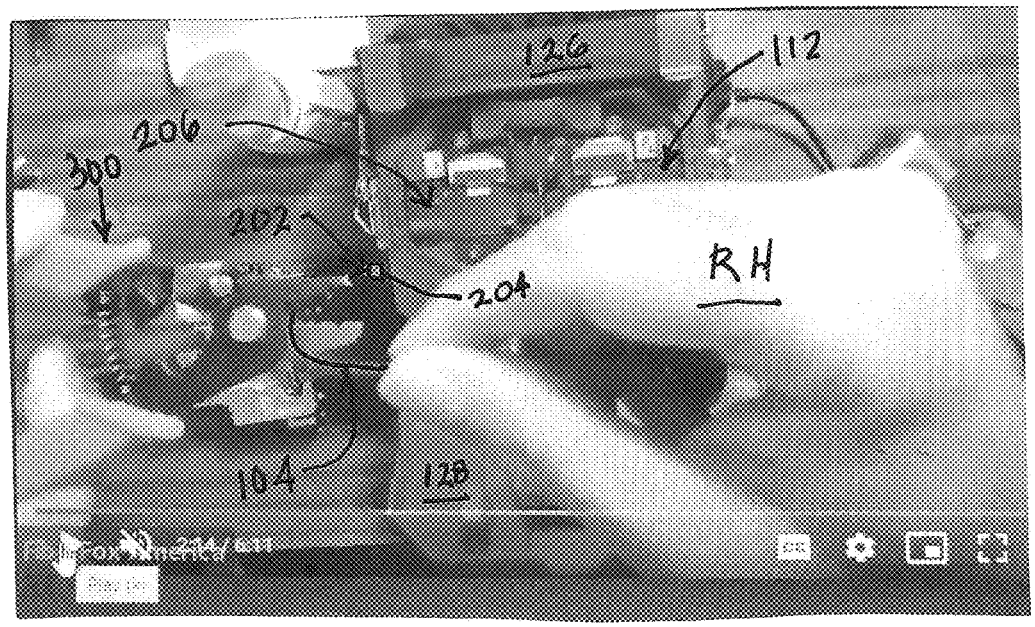

Step 9, Part 1: Open Splicer; Remove Optic Fibers; Cut; Re-Fuse End Faces. Because the fusion splicer 122 indicated a "failure" at the end-face plane 138, (within the now-joined end-face region 140), it became necessary to open the fusion splicer 122. This is done by removing cover 128 from operational portion 126. The technician next removed now-joined first and second optic fibers 104 and 202 from their respective first and second fiber holders 112 and 206. (Please refer to FIG. 9A.) After determining that "failure" resulted from a "fault" in the optic fibers 104, 202, it became necessary for the technician to use a pair of wire cutters 300 to cut optic fibers 104, 202 to remove the "fault." (Please refer to FIG. 9B.) To properly fuse the end faces of the optic fibers 104, 202, steps 2-8 were repeated.

Failure to Successfully Fuse Optic Fiber End Faces: Hypothetical Example 2. Let us assume that the fusion splicer 122 has notified the technician that end-face fusion of the optic fibers has again "failed," and that corrective action is required.

Step 9, Part 2: Open Splicer; Remove Optic Fibers; Cut; Re-Fuse End Faces. Because the fusion splicer 122 indicated a "failure" at the end-face plane 138, (within the now-joined end-face region 140), it shall again be necessary to open the fusion splicer 122. (Please refer to Step 9-1 and FIG. 9A.) After determining that "failure" resulted from a "fault" in the optic fibers 104 and 202, it became necessary for the technician to use a pair of wire cutters 300 to cut optic fibers 104 and 202 to remove the "fault." (Please refer to Step 9-1 and FIG. 9B.) Finally, in order to properly fuse the end faces of the optic fibers 104, 202, steps 2-8 were repeated.

Figure 10A:
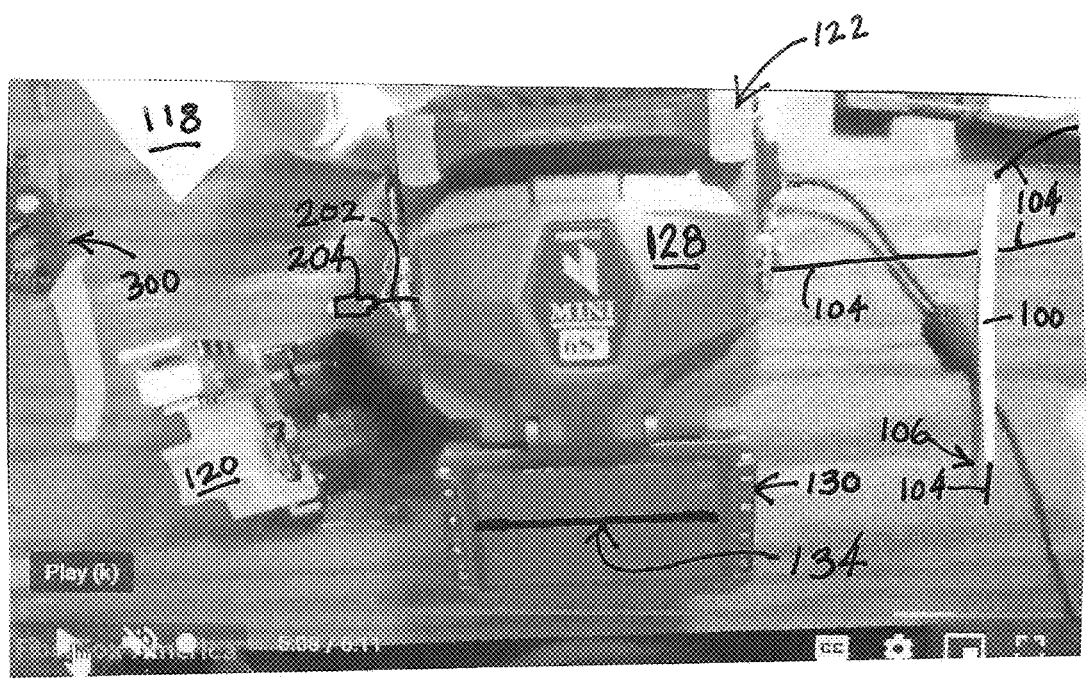
FIGS. 10A and 10B are video screen shots of step 10 of the method.
Figure 10B:
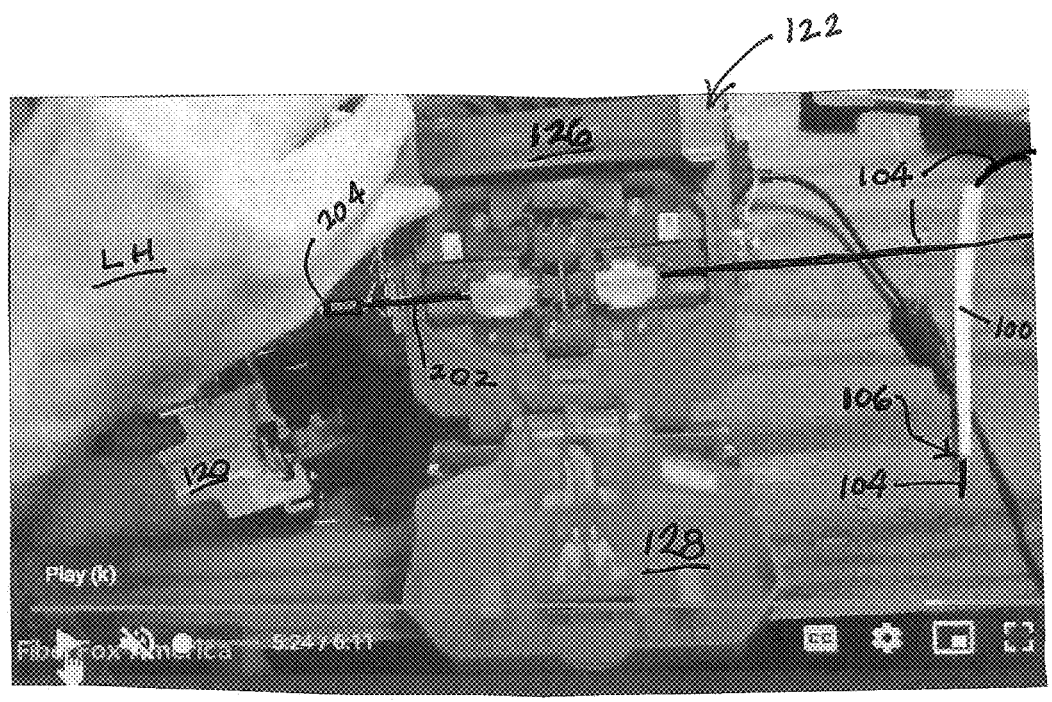

Step 10: End-Face Fusion of Optic Fibers Successful; Open Fusion Splicer. The end-face fusion of freshly-cleaved end portions of the optic fibers 104, 202 was again completed, which fusion splicer 122 indicated (FIG. 10A). This time, after steps 2-8 had been performed three times, end-face fusion was successful; and the fusion splicer 122 was opened by pivoting cover 128 toward panel 130 (FIG. 10B).

Figure 11A:
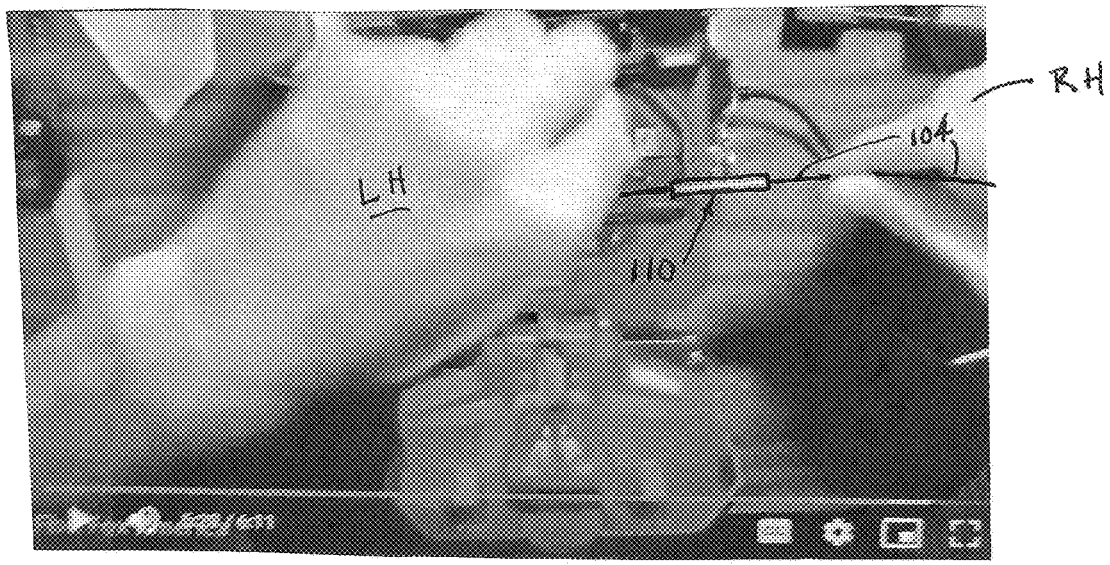
FIGS. 11A, 11B, 11C, and 11D are video screen shots of step 11 of the method.
Figure 11B:
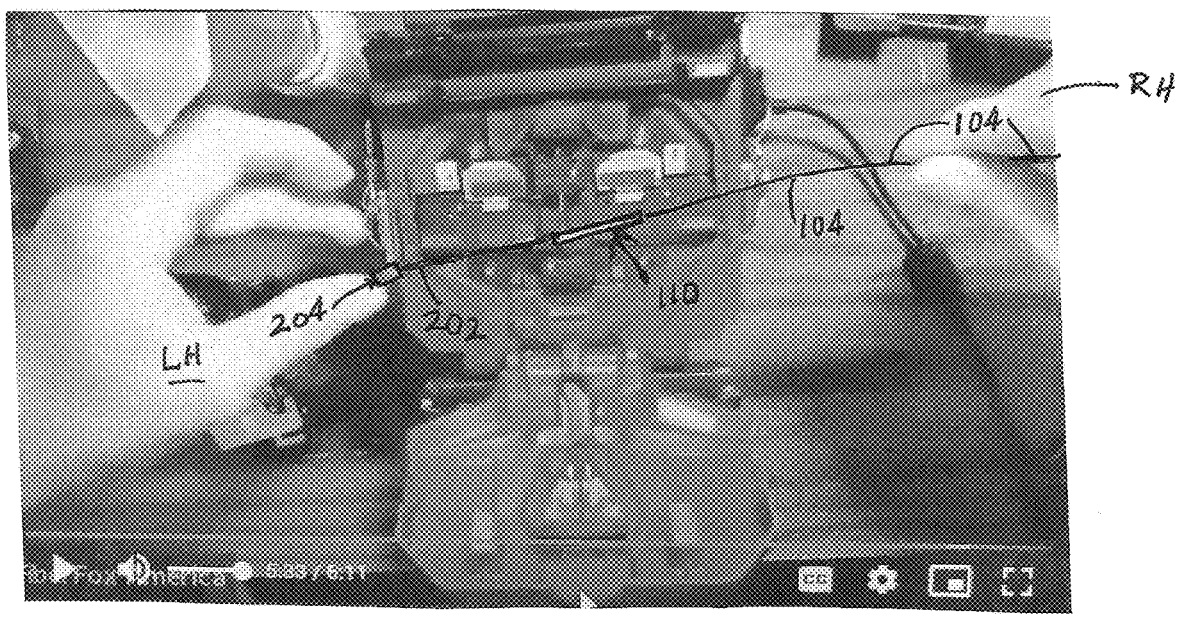
Figure 11C:
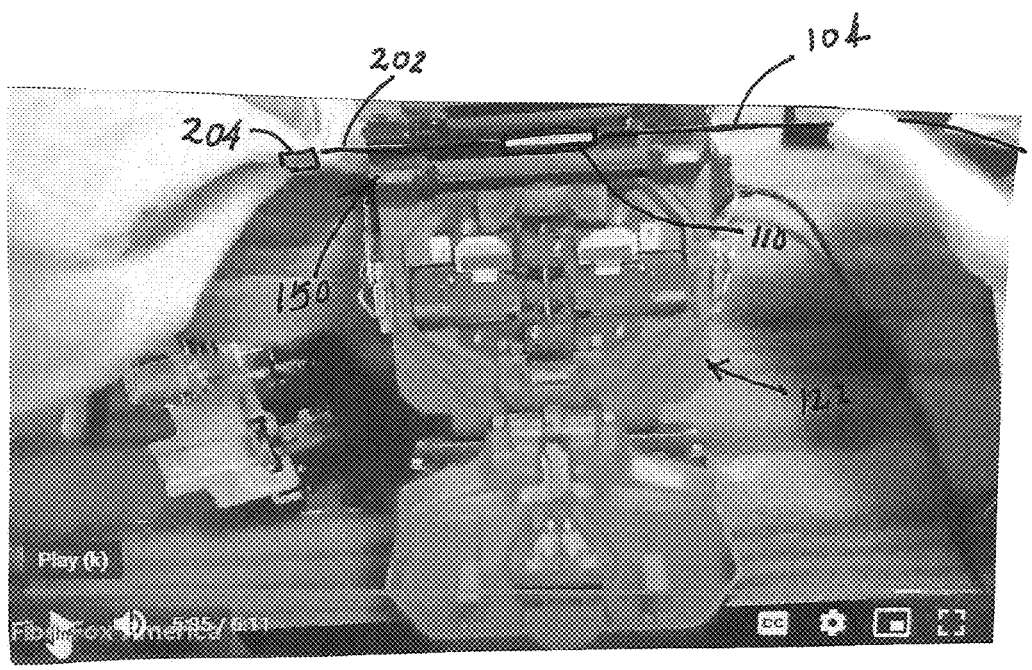
Figure 11D:
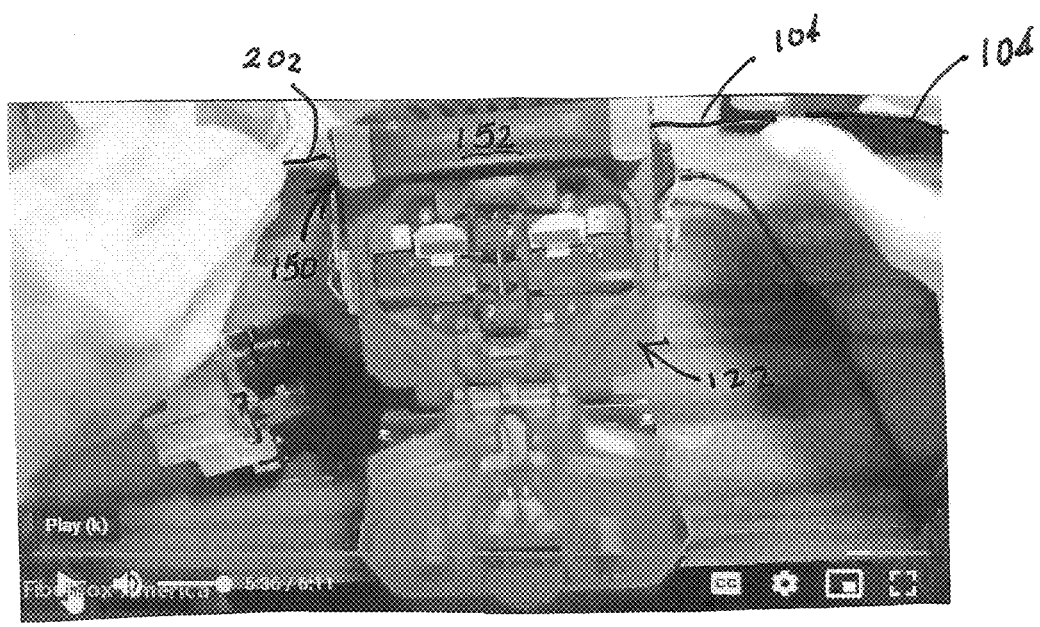

Step 11: Move Sleeve Over End-Spliced Area; Transfer Sleeved Area to Oven. After removing the spliced-together optic fibers 104, 202 (FIG. 10B) from the fusion splicer 122, the technician then slides protective plastic sleeve 110 (FIG. 11A) over an area surrounding the spliced optic fibers 104, 202 (FIG. 11B). Next, the technician transfers the sleeved, spliced optic fibers 104, 202 into an oven 150 (FIG. 11C), and brings an oven cover 152 over the sleeved area (FIG. 11D), to melt the sleeve 110 to protect the fused end-faces of the two optic fibers 104, 202.

Figure 12A:
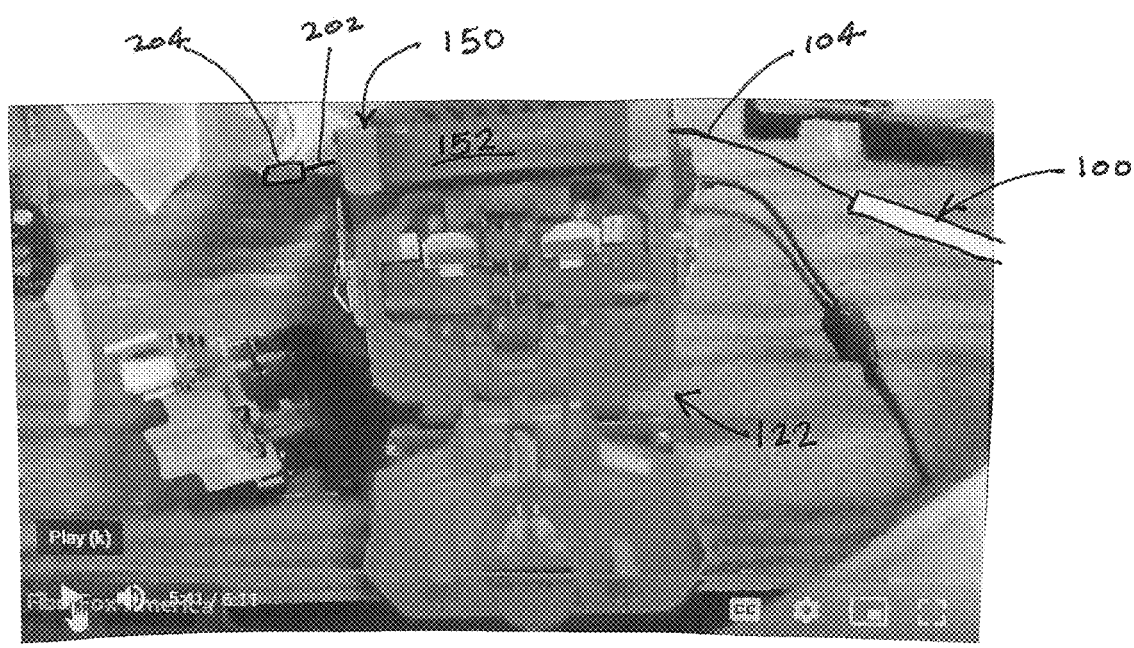
FIGS. 12A, 12B, 12C, and 12D are video screen shots of step 12 of the method.
Figure 12B:
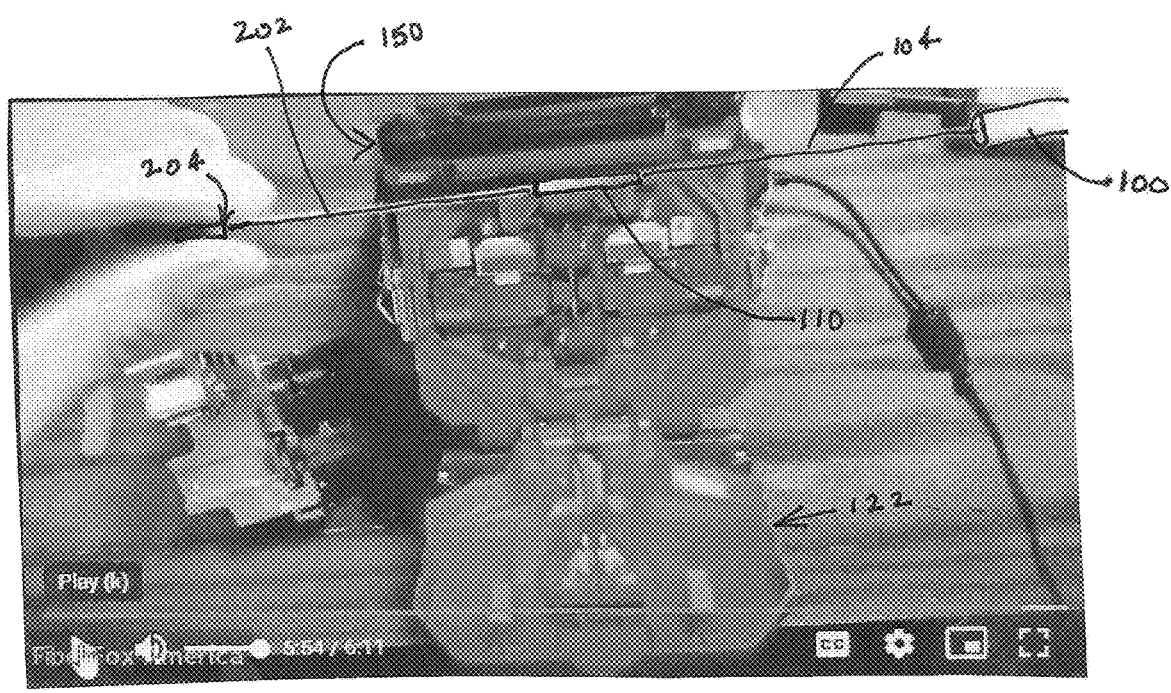
Figure 12C:
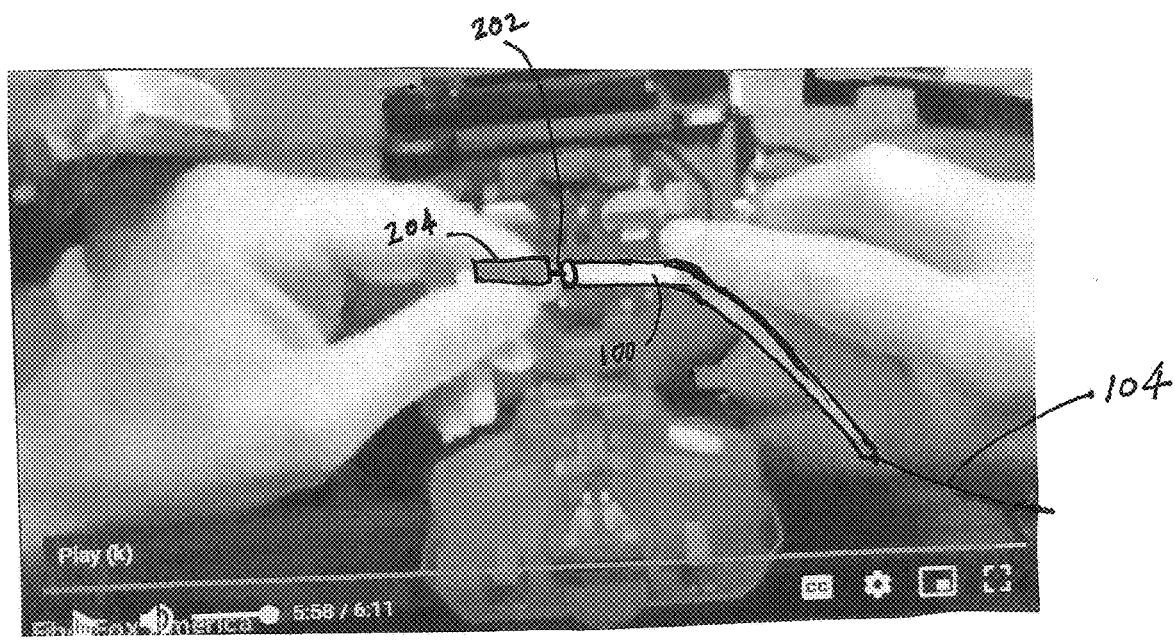
Figure 12D:
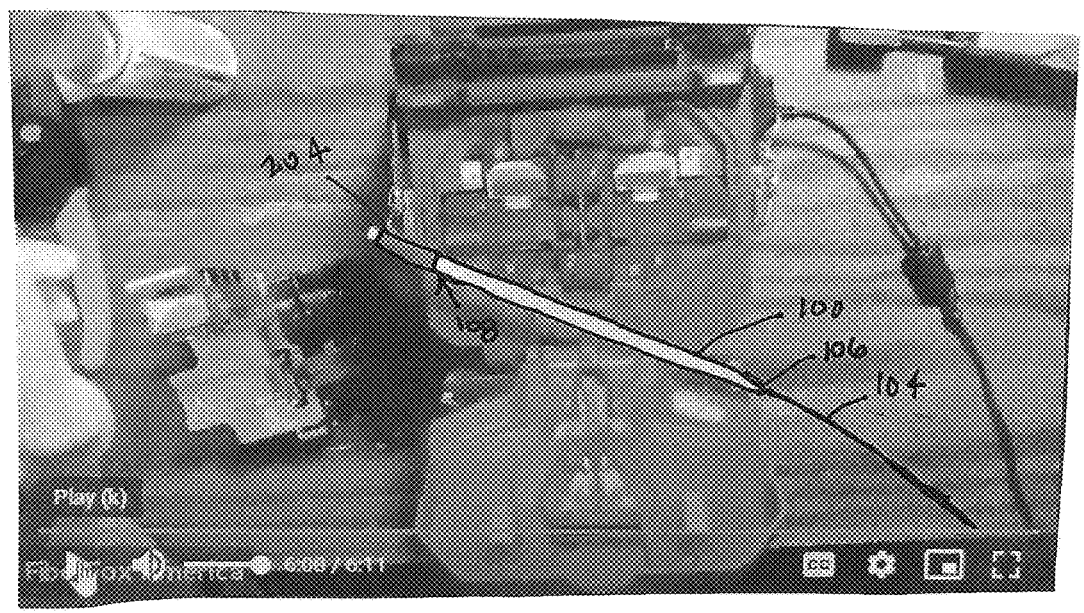

Step 12: Melt-Protection Completed; Remove Optic Fiber; Bring Up Boot. After the procedure to protect optic fibers 104, 202 by melting protective plastic sleeve 110 over their fused end-faces is completed (FIG. 12A), fused optic fibers 104, 202 are removed from oven 150 (FIG. 12B). Next, the technician brings up the boot 100 by sliding the boot 100 along the joined optic fibers 104 and 202 (FIG. 12B) toward optic fiber connector 204 (FIG. 12C). The technician then attaches boot end portion 108 opposite the tip 106 (FIG. 12D) to the optic fiber connector 204. This completes the process to fuse optic fiber end faces together.

Figure 13:
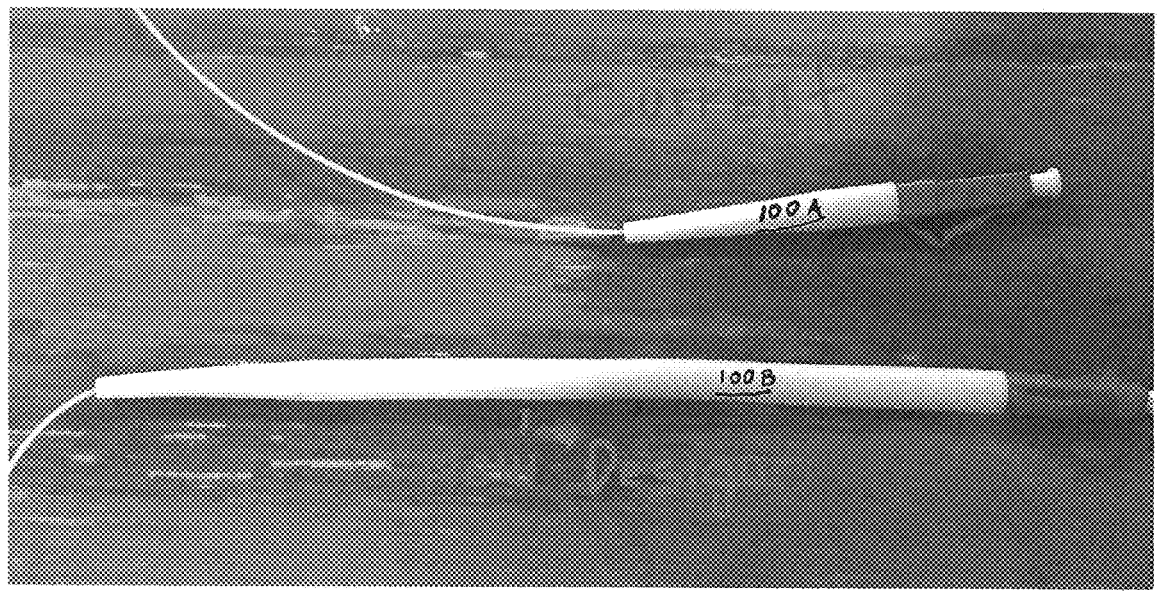
FIG. 13 depicts two examples of optic fiber stub portions, one depicting the prior art, and the other an elongated stub portion of the present subject matter.

Prior Art Rubber Boot vis-à-vis Example of Boot of Present Subject Matter. FIG. 13 depicts a prior art rubber boot 100A and an associated connector joined at an end of the prior art boot 100A. FIG. 13 also depicts another rubber boot 100B which is an illustrative example of the present subject matter. Prior art boots for FC, LC, SC, and ST type optic fiber connectors are about 40 millimeters ("mm") in length. Prior art boots for MPO optic fiber connectors are about 8 mm in length. Rubber boots of the present subject matter, for FC, LC, SC, and ST type optic fiber connectors are about 130 mm in length, and for MPO connectors is about 126 mm.

Figure 14:
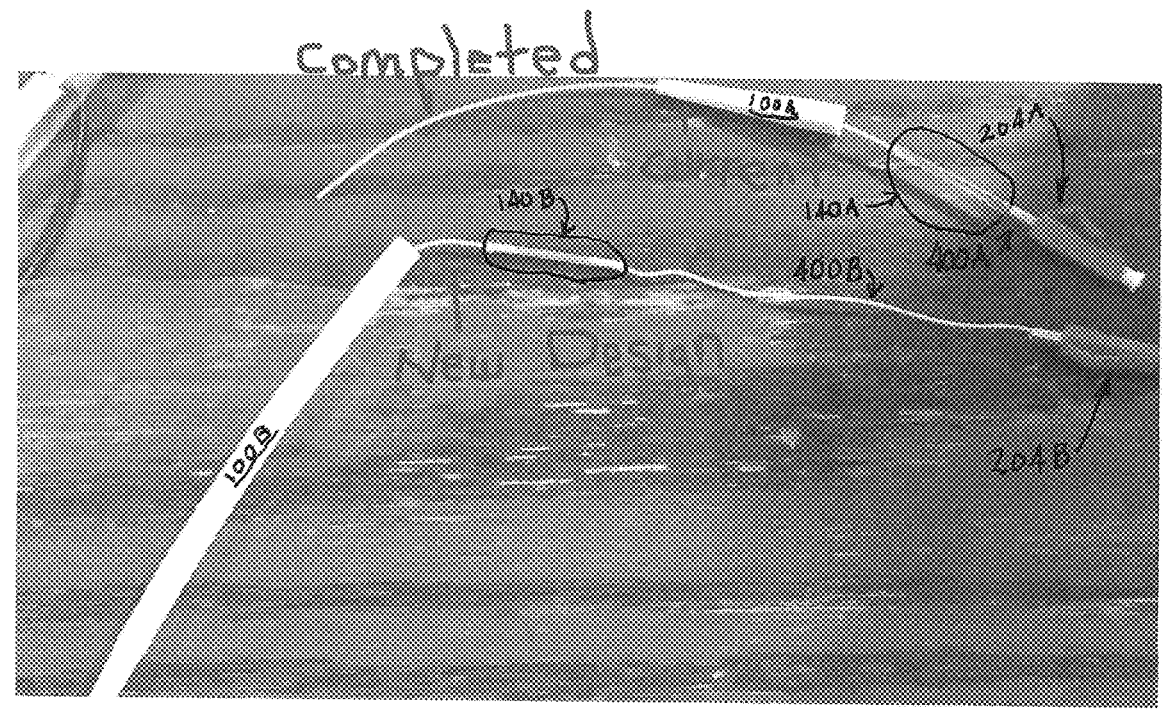
FIG. 14 depicts two examples of optic fiber stub portions shown in FIG. 13, but with their associated components disassembled, to clearly show select details.

Prior Art Fiber Stub Length vis-à-vis Stub Length of Present Subject Matter. FIG. 14 depicts a prior art rubber boot 100A separated from an associated connector 204A, and an optic fiber fused end-face region 140A located between the rubber boot 100A and connector 204A. For prior art, an optic fiber stub 400A extending from the connector 204A to optic fiber fused end-face region 140A is a piece of optic fiber measuring about 10 mm to about 15 mm in length. FIG. 14 also depicts a rubber boot 100B, which is an example of the present subject matter, separated from an associated connector 204B, and an optic fiber fused end-face region 140B located between the rubber boot 100B and connector 204B. In this example of the present subject matter, an optic fiber stub 400B extending from the connector 204B to the optic fiber fused end-face region 140B is a piece of optic fiber measuring about 120 mm to 130 mm in length, preferably 125 mm in length.

A re-spliceable splice-on connector and a method of making it is described. While the present subject matter is described in relation to embodiments, the present subject matter is not limited to these embodiments. On the contrary, many alternatives, changes, and/or modifications will become apparent to a person of ordinary skill in the art ("POSITA") after this application is read. Thus, alternatives, changes, and/or modifications are to be treated as forming a part of the present subject matter insofar as they fall within the spirit and scope of claims that follow.

I claim:

1. A method of re-splicing a splice-on connector ("SOC"), comprising:
   (1) stripping insulation away from an end portion of a first optic fiber;
   (2) stripping insulation away from an end portion of a second optic fiber having a connector body fixed to an opposite end portion thereof, wherein an end portion of the connector body is dimensioned and configured to be removably insertable into an end portion of an elongated hollow member;
   (3) splicing together the first and second fiber optic end portions to produce a splice-on connector ("SOC") or a re-spliced splice-on connector ("RSSOC"), wherein the SOC has a predetermined length to enable cutting at three predetermined locations spaced from the connector body;
   (4) if an operational fault is caused in a system using the SOC or RSSOC, cutting the SOC or the RSSOC at one of the three predetermined regions; and
   (5) repeating step (3).

2. The method of claim 1, wherein the hollow member is cylindrical, has a length of 140.0 mm, and an opposite end portion defining a frustoconical tip.

3. The method of claim 2, wherein the second optic fiber has a length ranging from about 120 millimeters ("mm") to about 122 mm.

4. The method of claim 3, wherein a first one of the three locations is spaced from about 96 mm to about 94 mm from the connector body, wherein a second one of the three locations is spaced from about 76 mm to about 74 mm from the connector body, and wherein a third one of the three locations is spaced about 56 mm to about 54 mm from the connector body.

5. A method of re-splicing a splice-on connector ("SOC"), comprising:
- (1) disposing an end portion of a first optic fiber into and longitudinally through one end portion of an elongated hollow member such that the first fiber end portion extends from an opposite end portion of the hollow member;
- (2) stripping insulation away from the end portion of the first optic fiber;
- (3) cleaning the insulation-stripped end portion of the first optic fiber with a preselected cleaning fluid to provide the first fiber with a clean end face;
- (4) cleaving the first optic fiber clean end face to provide a cleaved end portion;
- (5) positioning the first optic fiber cleaved end portion within a fusion splicer;
- (6) stripping insulation away from an end portion of a second optic fiber having a connector body fixed to an opposite end portion thereof, wherein an end portion of the connector body is dimensioned and configured to be removably inserted into the opposite end portion of the hollow member;
- (7) cleaning the insulation-stripped end portion of the second optic fiber with a preselected cleaning fluid to provide the second fiber with a clean end face;
- (8) cleaving the second fiber clean end face to produce a cleaved end portion;
- (9) closely spacing the cleaved end portions of the first and second optic fibers;
- (10) using the splicer to splice together the closely spaced cleaved end portions of the optic fibers, to thereby produce either a splice-on connector ("SOC") or a re-spliced splice-on connector ("RSSOC"), wherein the SOC has a predetermined length effective for cutting the SOC or the RSSOC at three predetermined locations spaced seriatim from the connector body;
- (11) positioning a heat-meltable sleeve relative to the spliced-together first and second optic fiber end portions such that the sleeve encloses the first and second optic fiber spliced-together end portions, wherein the sleeve is sized and configured to fit within an interior region of the hollow member;
- (12) inserting the spliced-together fiber end portions enclosed by the sleeve into an oven having an interior heated to a predetermined temperature to cause the sleeve to melt onto the spliced-together optic fiber end portions;
- (13) moving the elongated hollow member relative to the spliced-together first and second optic fiber end portions such that the spliced-together optic fiber end portions are disposed within the hollow member interior region;
- (14) inserting the connector body end portion into the opposite end portion of the elongated hollow member;
- (15) if an operational fault is caused in a system using the SOC or the RSSOC, removing the connector body end portion from the hollow member,
- (16) cutting the SOC or the RSSOC at one of the three predetermined regions;
- (17) using the fusion splicer to splice together closely-spaced other pairs of cleaned-and-cleaved end portions of the first and second optic fibers; and
- (18) repeating step (11) through step (14).

6. The method of claim 5, wherein the hollow member is essentially cylindrical, and wherein the one open end portion defines a frustoconical tip.

7. The method of claim 6, wherein the second optic fiber has a length ranging from about 120 millimeters ("mm") to about 122 mm.

8. The method of claim 7, wherein a first one of the three predetermined locations is spaced from about 96 mm to about 94 mm from the connector body.

9. The method of claim 7, wherein a first one of the three predetermined locations is spaced about 95 mm from the connector body.

10. The method of claim 7, wherein a second one of the three predetermined locations is spaced from about 76 mm to about 74 mm from the connector body.

11. The method of claim 7, wherein a second one of the three predetermined locations is spaced about 75 mm from the connector body.

12. The method of claim 7, wherein a third one of the three predetermined locations is spaced from about 56 mm to about 54 mm from the connector body.

13. The method of claim 7, wherein a third one of the three predetermined locations is spaced about 55 mm from the connector body.

14. The method of claim 7, wherein the hollow member has a length ranging from about 137.8 mm to about 140.0 mm, and wherein the sleeve is cylindrical and has a length ranging from about 31.1 mm to about 31.6 mm.

\* \* \* \* \*